(12) United States Patent
McCormack

(10) Patent No.: US 7,426,714 B1
(45) Date of Patent: Sep. 16, 2008

(54) METHODS AND APPARATUSES TO DETERMINE DYNAMIC DATES

(75) Inventor: Christopher Thomas McCormack, Santa Ana, CA (US)

(73) Assignee: Principal Decision Systems International, Irvine, CA (US)

( * ) Notice: Subject to any disclaimer, the term of this patent is extended or adjusted under 35 U.S.C. 154(b) by 337 days.

(21) Appl. No.: 10/191,027

(22) Filed: Jul. 2, 2002

(51) Int. Cl.
*G06F 9/44* (2006.01)
*G06F 9/46* (2006.01)

(52) U.S. Cl. ............ 717/114; 717/104; 705/8; 705/9

(58) Field of Classification Search .......... 368/10, 368/28; 705/8–9; 707/104; 717/104, 114
See application file for complete search history.

(56) References Cited

U.S. PATENT DOCUMENTS 4,415,271 A * 11/1983 Mori .................... 368/41
5,317,546 A * 5/1994 Balch et al. ............ 368/9
5,893,073 A * 4/1999 Kasso et al. ............ 705/8
6,272,074 B1 * 8/2001 Winner ................. 368/10
6,687,678 B1 * 2/2004 Yorimatsu et al. ...... 705/8
7,039,595 B1 * 5/2006 Lilly et al. ............. 705/8

OTHER PUBLICATIONS

Brian Linden, "Outlook 2002 Calendar", Computing & Information Services, University of New Hampshire, Copyright © 2001:2003, Last Updated: Apr. 19, 2002, pp. 5 total.
"Beginners—Microsoft Outlook 2000—The Calendar Tutorial", http://tutorials.beginners.co.uk/read/query/Outlook%202000/id/292, May 14, 2002, pp. 1-3.

* cited by examiner

*Primary Examiner*—Lewis A. Bullock, Jr.
*Assistant Examiner*—Jason Mitchell
(74) *Attorney, Agent, or Firm*—Blakely Sokoloff Taylor & Zafman LLP

(57) ABSTRACT

A method, apparatus, and system in which a resultant date is modified based upon the date-effecting condition. A date input is received as an expression having one or more components and other parameters that modify the value of a particular component. The expression establishes and manipulates a target date in order to determine a resultant date. A determination is made if a date-effecting condition is associated with the expression. The resultant date is modified based upon the date-effecting condition.

36 Claims, 7 Drawing Sheets

Some actions that the engine may do with
the resultant date

Determine if a date-effecting condition is associated with the date input. Different types of date-effecting conditions may exist such as
a) Numeric date-effecting identifier; b) Mathematical date-effecting identifier; c) Boolean date-effecting identifier; and d) Pattern date-effecting identifier.
512

Compare the resultant date against any date-effecting conditions. Typically, the camparison yields a true false result. Take an action based upon that comparison such as generate a modified resultant date.
514

Schedule events to occur based upon the resultant date or potentially modified resultant date.
516

Retrieve information associated with the resultant date or potentially modified resultant date.
518

Derive information from the comparing the resultant date or potentially modified resultant date with other information.
520

Store this first resultant date for later use such as comparing with a second date, or retrieve a stored resultant date for a comparison.
522

Resolve compounded expressions that include date effecting conditions and/or resultant dates.
524

Storing an expression under an Alais for future use.
526

End
590

Figure 5b

METHODS AND APPARATUSES TO DETERMINE DYNAMIC DATES

NOTICE OF COPYRIGHT

A portion of the disclosure of this patent document contains material that is subject to copyright protection. The copyright owner has no objection to the facsimile reproduction by anyone of the software engine and its modules, as it appears in the Patent and Trademark Office Patent file or records, but otherwise reserves all copyright rights whatsoever.

FIELD OF THE INVENTION

Embodiments of the invention generally relates to software applications that are date driven. More particularly an embodiment of this invention relates to establishing a resultant date based upon an expression as the date input.

BACKGROUND OF THE INVENTION

Typically, software development is date driven or date related. Reporting tools, event scheduling applications, etc., all do something based on a date or date range. For example, if you wanted a reporting tool to generate a report automatically on the 2nd MONDAY following the end of each payroll period, a user or programmer typically manually specifies each of those dates far into the future.

Some date driven programs only accept a constant date value for a date input, such as 12/23/2002. The date 12/23/2002 only occurs once in history and always represents December twenty-third two thousand and two. The value represented by that constant date in date input doesn't change based upon other factors. Thus, these programs are very limited in the types of actions they may perform without the addition of a lot of manual programming each time the fixed date value needs to be altered.

Typically, date driven programs lack the intelligence to alter the value represented by a date due to the existence of condition. For example, some scheduling programs allow a user to program a reoccurring date. Typically, some of the scheduling programs allow an action, such as generating paychecks, to be connected to that reoccurring date. However, in general, if one of the reoccurring dates occurs on a date that also happens to be a holiday, then these scheduling programs lack the intelligence to automatically alter the value represented by that occurrence of the reoccurring date due to the existence of the holiday condition.

SUMMARY OF THE INVENTION

A method, apparatus, and system in which a method modifies a resultant date based upon the date-effecting condition. A date input is received as an expression having one or more components and other parameters that modify the value of a particular component. The expression establishes and manipulates a target date in order to determine a resultant date. A determination is made if a date-effecting condition is associated with the expression. The resultant date may be compared to the date-effecting condition and subsequently modified based upon that comparison.

BRIEF DESCRIPTION OF THE DRAWINGS

The drawings refer to the invention in which:

FIGS. 5a and 5b illustrate an exemplary flow diagram to establish a resultant date based upon an expression having one or more components and corresponding parameters that modify the value of the components and then taking an action based upon the resultant date.

Figure 1:
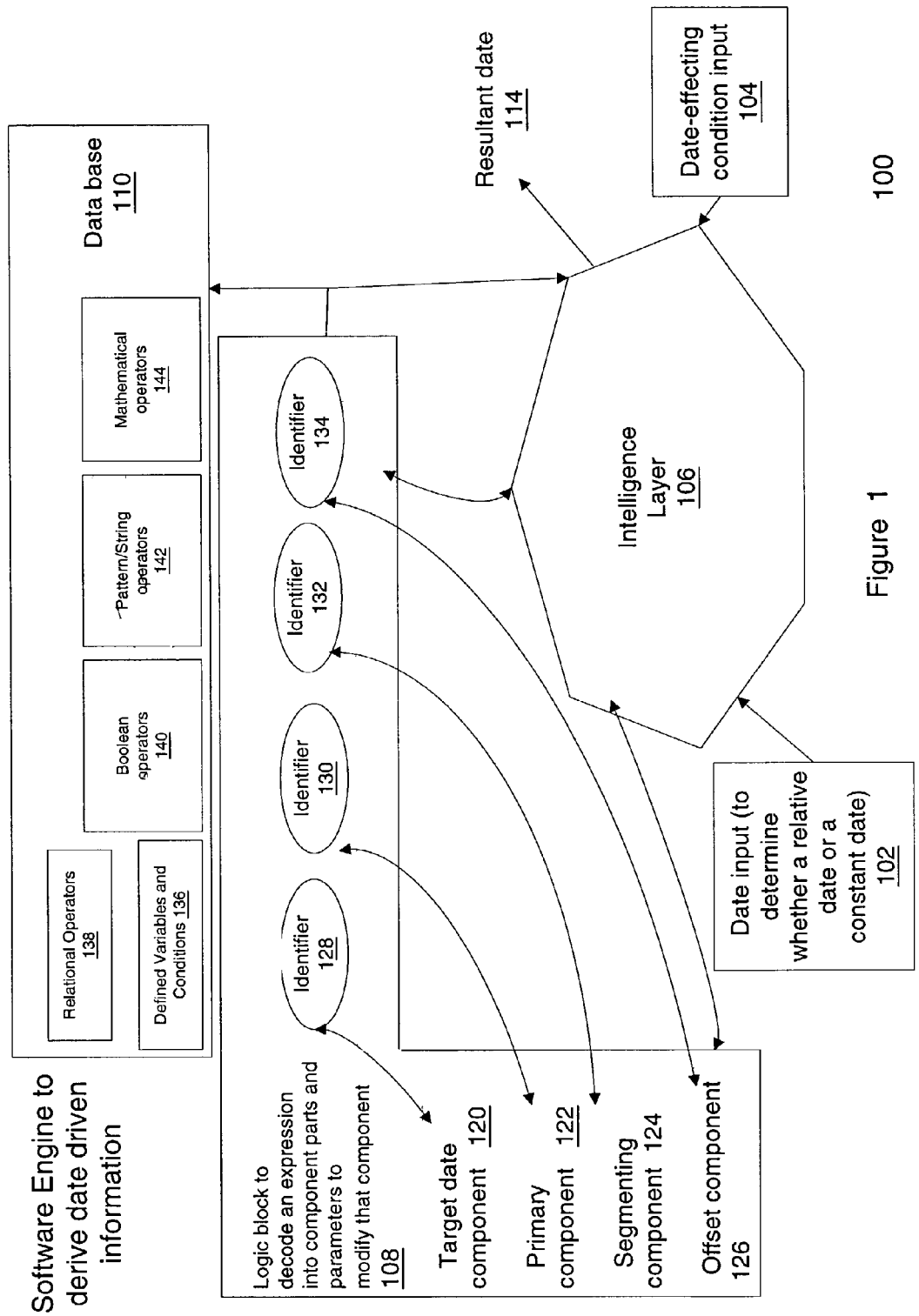
FIG. 1 illustrates a block diagram of an embodiment of a software engine having a date input and date-effecting condition input to determine a resultant date.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific expressions, named components, connections, types of parameters, etc., in order to provide a thorough understanding of the present invention. It will be apparent, however, to one of ordinary skill in the art that the present invention may be practiced without these specific details. In other instances, well known components or methods have not been described in detail but rather in a block diagram in order to avoid unnecessarily obscuring the present invention. The specific details may be varied from and still be contemplated to be within the spirit and scope of the present invention. The term coupled is defined as meaning connected either directly or indirectly.

In general, a method, apparatus, and system are described in which a resultant date is modified based upon a date-effecting condition. A date input is received as an expression having one or more components and other parameters that modify the value of a particular component. The expression establishes and manipulates a target date in order to determine a resultant date. A determination is made if a date-effecting condition is associated with the expression. The resultant date is compared against the date-effecting condition. After the comparison, if the date-effecting condition is found to be satisfied then modifying the resultant date by compounding that date with another expression. Other features and advantages of embodiments of the invention will be apparent from the accompanying drawings and from the detailed description that follows below.

FIG. 1 illustrates a block diagram of an embodiment of a software engine having a date input and date-effecting condition input to determine a resultant date. In an embodiment the software engine 100 may include the date input 102, the date-effecting condition input 104, an intelligence layer 106, a logic block 108, and a database 110. The date input 102 receives an expression having one or more components and other parameters that modify the value of a particular component. The expression in the date input 102 establishes and manipulates a target date in order to determine a resultant date. The date-effecting condition input 104 may contain one or more date-effecting conditions associated with the expression. The intelligence layer 106 examines the content in the date input 102 and the date-effecting condition input 104. The intelligence layer 106 references the logic block 108 to resolve the expression and any date-effecting conditions in order to generate a resultant date 114. The logic block 108 breaks up the expression into its component parts and other parameters that modify the value of a corresponding component. The logic block 108 and intelligence layer 106 reference the database 112 for algorithms and data to decode and solve the expression. An exemplary expression may have target date component 120, a primary component 122, a segmenting component 124, and an offset component 126. Another exemplary expression may only have a target date component 120. Each component may have an associated parameter, such as an identifier 128-136, to modify the value of that component.

The expression given as a date input may have a relative date value or a constant date value. If the software engine 100 determines that the expression has a relative date value, for example Easter, then the intelligence layer 106 decodes the expression to establish a target date as a starting point and uses the corresponding parameters to modify the target date determine a resultant date 114. If the intelligence layer 106 determines that the expression has constant date value, for example 12/23/2002, then the constant date value becomes the resultant date 114. The intelligence layer 106 also determines if one or more date-effecting conditions are associated with the expression. If so, the intelligence layer 106 may reference the database 110 to resolve the date effecting conditions. The intelligence layer compares the resultant date against the date effecting condition. After the comparison, then the resultant date can be compounded with another expression to return a modified resultant date. The intelligence layer 106 may then also use the potentially modified resultant date for further actions, such as comparing this resultant date with another date, retrieving information associated with the modified resultant date, etc. Also, the software engine 100 may store or supply the potentially modified resultant date to any date driven program such as a scheduling program or a reporting tool.

As described later, an expression having a constant date value is limited to a specific numeric date in history, such as 12/14/2002. A relative date value is one in which the value represented by that relative date given as the date input does change based upon other factors. An expression having a relative date value, may be variable numeric values or date varying words such as Sunday, Memorial Day, first Wednesday in March, etc. The expression having a relative date value changes the resultant date based upon the modifications made to the target date by parameters acting upon the target date.

The database 110 contains parameters a predefined date effecting conditions 136 and operators used in a date-effecting comparison such relational operators 138, mathematical operators 144, Boolean operators 140, pattern/string operators 142, and other similar operators. The database 110 may also store defined variables such as date implicating words, "Today," Named Days of the week, "Leap Day," Holidays, phrases such as "The first Sunday of the month," etc. The database 110 may also store defined date implicating word occurrences and intervals such as shift workweek, pay period, etc.

A user interface may exist to allow a user to supply a date input an expression. The user interface may have multiple screens to encompass the content to be supplied with or associated with the expression. One exemplary screen may have data entry fields such as start date, a recurrence pattern, etc. A user may also type the expression directly into the date input. Similarly, a protocol can be used to have the software engine 100 cooperate with another software program in order to receive the date input as an expression.

In an embodiment, the components in an expression may be comprised of constants, variables, and symbols, which are all interpreted by the intelligence layer 106 and logic block 108 to lead to a resultant date 114. For example, the expression containing constants and variables may be expressed as "schedule a meeting for the first Monday of every month" as well alternatively expressed in another form adding symbols "Schedule meeting (##/01/####)Monday(+1)."

Figure 2:
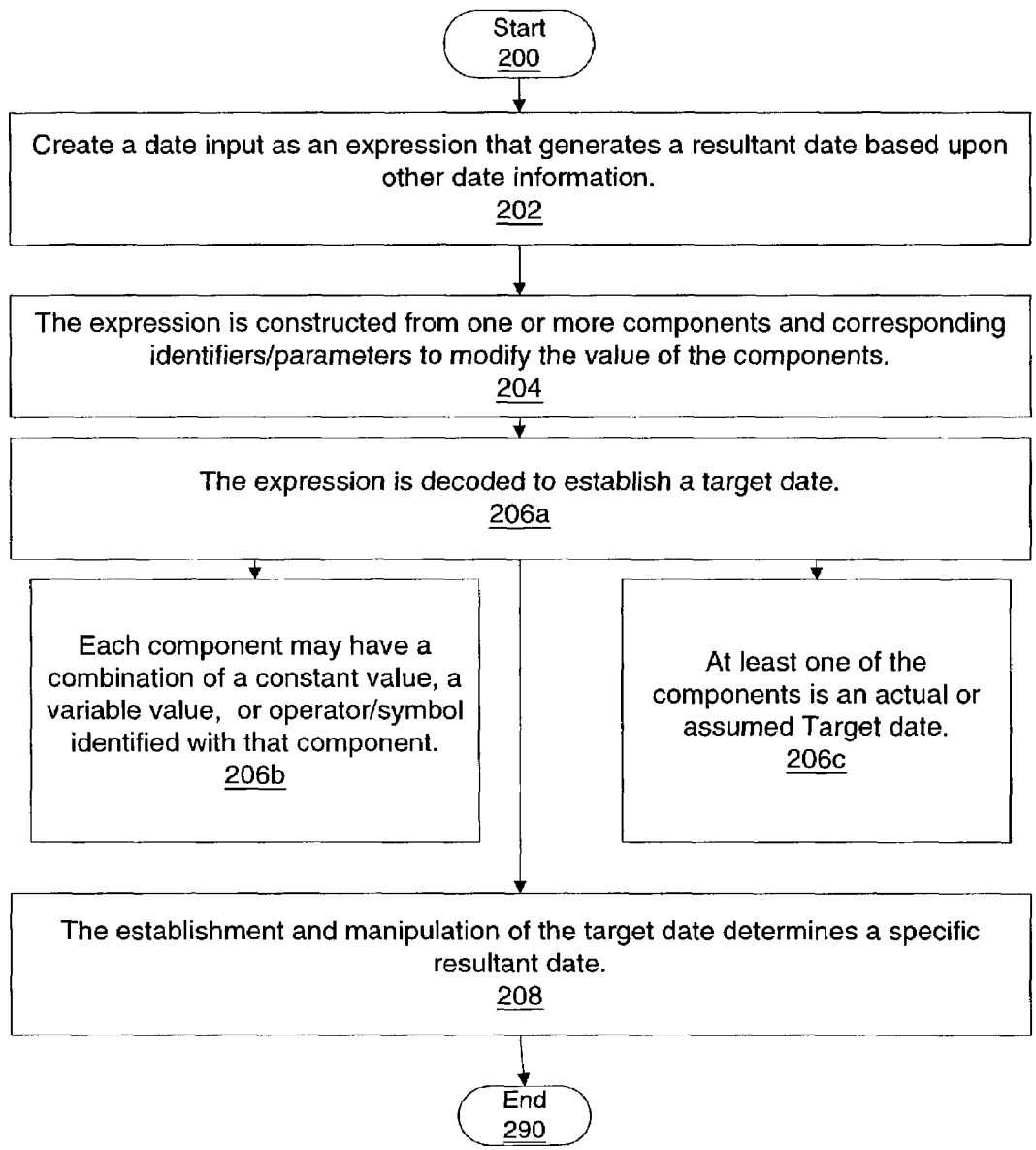
FIG. 2 illustrates a flow diagram of an exemplary creation and decoding of an expression giving a date input.

FIG. 2 illustrates a flow diagram of an exemplary process for creation and decoding of an expression given as a date input.

In block 202, the software engine allows the creation of a date input as an expression whose decoding generates a resultant date based upon other date information.

In block 204, a user, manually enters or via a user interface, constructs the expression from one or more components and corresponding identifiers/parameters to modify the value of the components. The engine then receives the date input as an expression.

In blocks 206a, 206b, and 206c, the software engine decodes the expression to establish a target date. Each component may have a combination of a constant value, a variable value, or operator/symbol identified with that component. At least one of the components is an actual or assumed target date to be used as a starting point.

In block 208, the establishment and manipulation of the target date determines a specific resultant date. If the expression has a relative date value then the resultant date is based upon the one or more components and corresponding parameters that modify the value of the components in the expression. If the expression has a constant date value, then only one date can be returned. Thus, the resultant date is the same as the constant date value.

Figure 3:
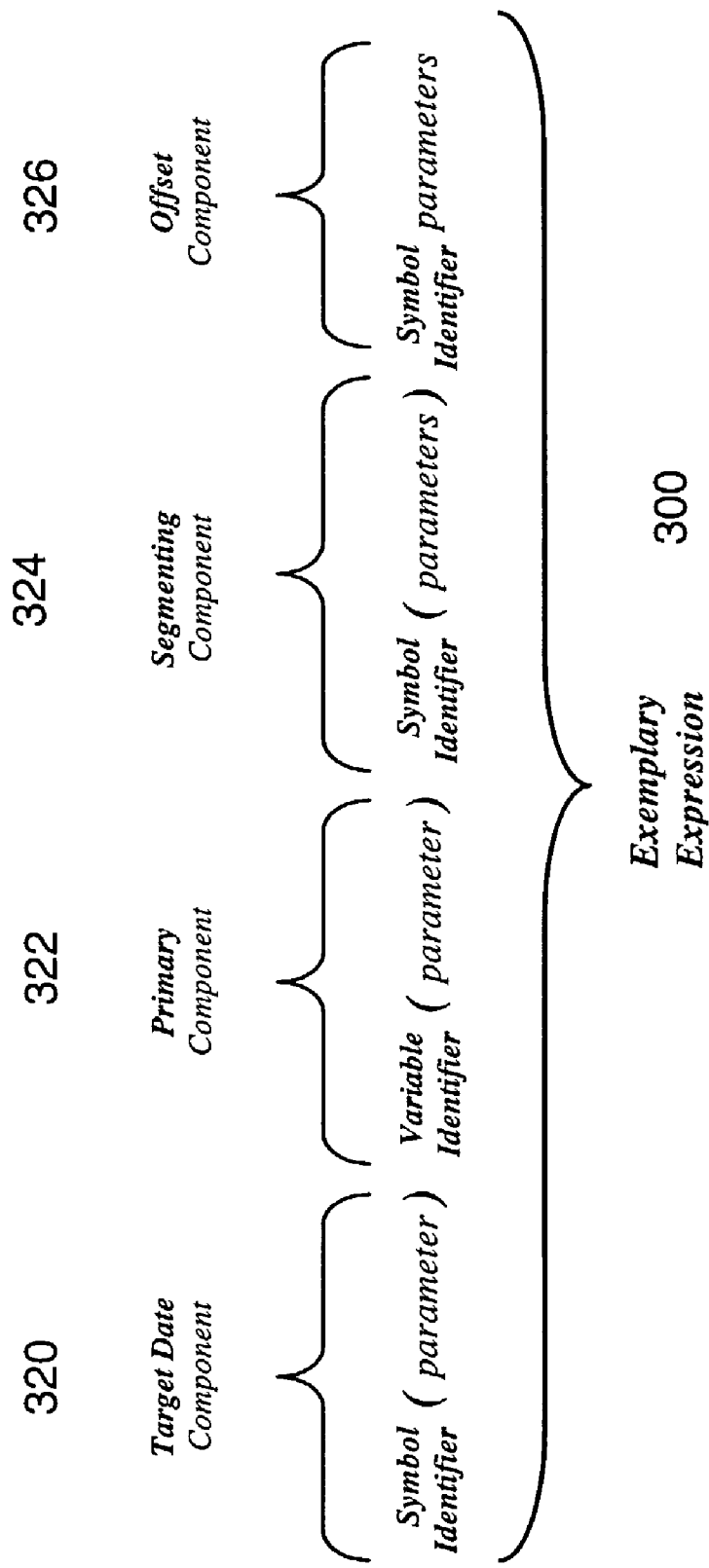
FIG. 3 illustrates an exemplary expression having one or more components and corresponding parameters to modify the value of a particular component.

FIG. 3 illustrates an exemplary expression having one or more components and corresponding parameters to modify the value of a particular component. One or more components compose expressions. Each component has a specific effect in how a date's resultant value is evaluated. The exemplary expression has four types of components: a target date component 320, a primary component 322, a segmenting component 324, and an offset component 326. Components 322-326 in an expression other than the target component 320 act as parameters to modify the value of the target date. The corresponding identifiers contained in each component define constant values, variable values, or functions to be performed. However, the components 320-326 do not need to have an assigned value. For example, the expression may be as simple as "Today." The intelligence layer refers to logic block to decode the target date of the word, "Today." The intelligence layer references the defined variable block in the database to decode that the word "Today" has a default value of whatever the current date is at the time when the intelligence layer resolves the expression.

As noted above, the Target Date component 320 may have an assigned or an assumed value. Targets are the initial values, supplied by the system or the user, to be used as starting points of resultant dates. Targets are generally provided, but are not always required for use.

The target date is the actual date the system uses to start its interpretation of an expression. The intelligence layer interprets the target date component 320 as a segment of time having units of time i.e. months, a range of time (e.g., the month of February) and then defining the segmenting interval (e.g., Sundays). If the given target date was "the second Sunday of the month of February" then the intelligence layer can now traverse the month of February by stepping through the Sunday segments. If the target date was modified by the parameter (+1) "*(the second Sunday of the month of February) (+1)", in our example, then the intelligence layer starts at the target date and then traverses to the next Sunday to generate a resultant date.

In an embodiment, in cases where the target date is not specified "TODAY" is the assumed parameter. The assumed parameter "(TODAY)" is defined and stored in the database. The intelligence layer references the database and interprets the word "TODAY" as "redefine the Target Date as the numeric value associated with the current date.

No redefining of the Target Date is necessary when using a constant date as the primary component 322 because the intelligence layer returns just the constant date Identifier. For example: *(01/01/2001)12/25/2001 returns a resultant date of 12/25/2001. The intelligence layer decodes the expression to mean find the nearest occurrence of the date 12/25/2001 nearest to the Target Date 01/01/2001. Since there is only one 12/25/2001 is history, it does not matter what the Target Date is, the intelligence layer returns the only one date available, 12/25/2001.

The primary component 322 can be another date input to reference the target date against. The offset component 324 may be used to set off a previous component's date value by a fixed amount. The segmenting component 326 may be used to explicitly segment time based on the given parameters and the date returned by the preceding components in the expression.

The logic block may be programmed to also decode three types of identifiers used with the components, Constants, Variables, and Symbols. Constants such as 12/23/2000 always represent the same value. Variable can have different values based upon differing conditions. Symbols are non-numeric elements that convey when and how to use a component.

Figure 4:
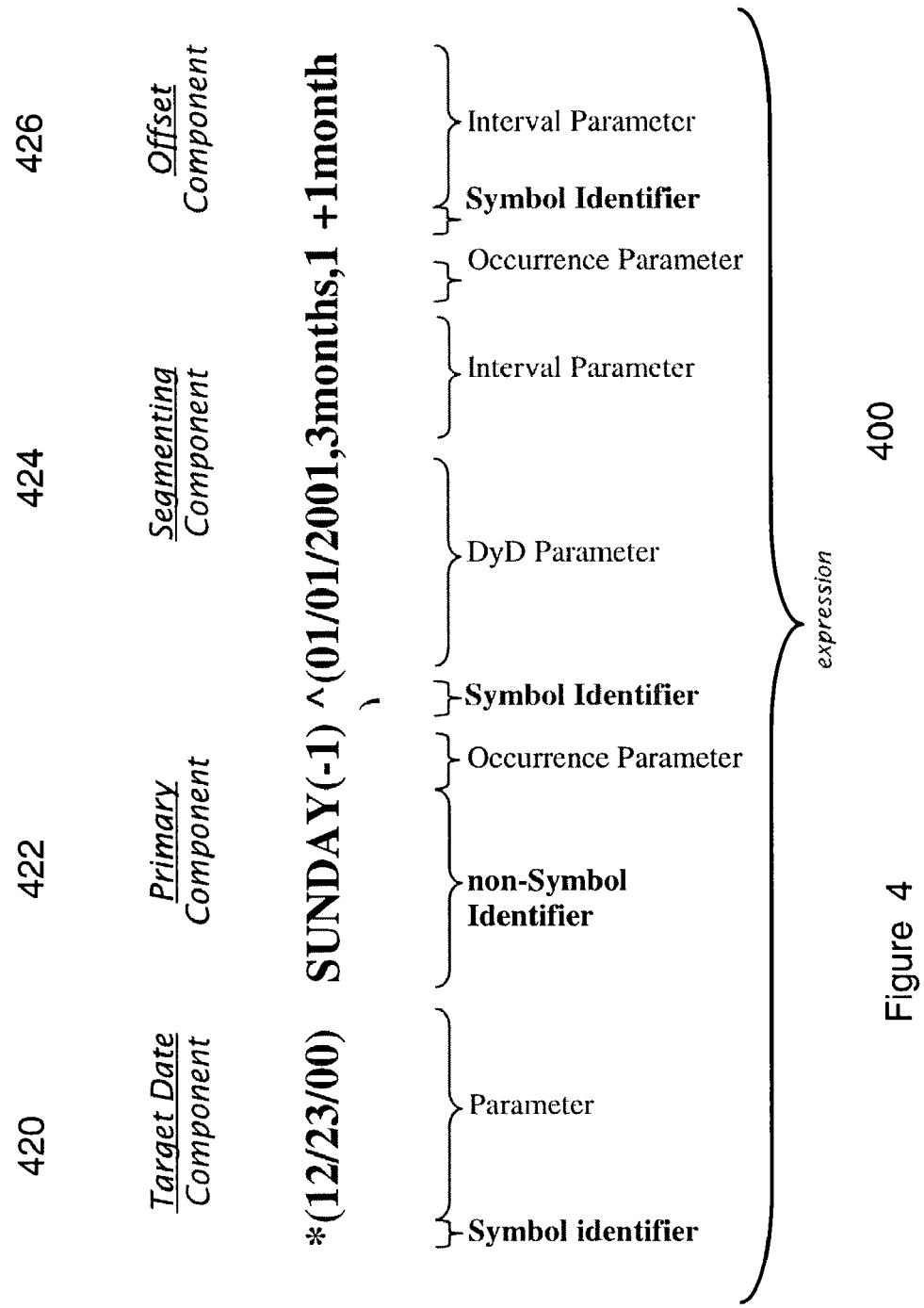
FIG. 4 illustrates an exemplary expression having a target date component and parameters that modify the value of the target date component.

FIG. 4 illustrates an exemplary expression having a target date component and parameters that modify the value of the target date component. This exemplary expression contains four types of components: a target date component 420, a primary component 422, a segmenting component 424, and an offset component 426. The exemplary expression 400 having a relative date value is "*(12/23/2000)SUNDAY(−1)^(01/01/1990,28 days,−1)+1month."

The value of the exemplary target date component 420 is *(12/23/2000) and thus the starting point.

As noted, the primary component 422 can be another date input to reference the target date against. In this example, Sunday may be the primary component 422 in the expression "*(12/23/2000)SUNDAY(−1)" and (−1) may be an Occurrence parameter modifying the primary component 422. The Occurrence parameter determines which "occurrence" of the named Identifier will be returned. The Occurrence parameter evaluates a positive or negative number, such as "−1". When used, the (−1) means: "the first on or before." Similarly, the plus symbol "+" may signify "on or after." Where the "1" in the parameter signified "the first" occurrence, the system can also use any numeric value to signify the nth occurrence of the named Identifier. Thus, the intelligence layer decodes the expression "*(12/23/2000)SUNDAY(−1)" as a target date of 12-23-2000 modified by the first Sunday on or before that date, 12/23/2000.

As noted, the Offset component 426 may be used to adjust the previous component's date value by a fixed amount. The Offset component 426 uses the Symbol Identifiers of "+" or "−", a constant numerical value (e.g., 1, 7, 31), and follows with a measurement of time (e.g., years, months, weeks, days, hours, minutes, and seconds). Thus, the intelligence layer decodes the expression "*(12/23/2000)SUNDAY(−1)+1month" to add one month to the previous components date value to generate a resultant date. In this example, the corresponding resultant date is the first Sunday on or before the target date of 12-23-2000 modified by adding one month that Sunday's date. i.e. a resultant date occurring in January 2001.

Referring to FIG. 1, the database 110 maintains defined variables such as the word "Sunday" as well as the current numeric date and time in order to supply this information to the logic block 108. The logic block 108 then decodes the expression and the intelligence layer 106 resolves the expression.

Referring to FIG. 4, the segmenting component 424 is used to explicitly segment time based on the given parameters and the date returned by the preceding components. The segmenting component 424 may be characterized by the use of the "^" Symbol Identifier and accepts three parameters. The first parameter defines the date from which segmenting will be based on or started. The second parameter is the interval parameter. The third is an Occurrence parameter. Finally, the date returned by the component previous to the segmenting component is used as the reference (starting point) in the time segment. Thus, the segmenting component may be represented as, "COMPONENT (Reference Date)}^(Start Date( ), Interval, Occurrence)."

In other words, the segmenting component uses the date returned by its first parameter to define a starting period. The segmenting component 424 then segments time into intervals defined in its second parameter, and then returns the nth Occurrence (based on the Occurrence parameter) from the date returned by the previous component (the component just left of the segmenting component 424).

In this example, the previous components have determined a reference date of the first Sunday on or before the target date of 12-23-2000. The logic block decodes the exemplary segmenting component, 01/01/2001,3 months,1, to mean starting on the $1^{st}$ of Jan., 2001 ($1^{st}$ parameter), segment time every 3 months ($2^{nd}$ parameter) and return the first occurrence (3rd parameter) of one of these time segments that occurs after the reference date (date returned by previous component). Thus, the resultant date time segment returned is 01/01/2001 to 03/31/2001.

As can be seen for the above exemplary expression, a date input given as an expression having a relative date value to the software engine may be very complex indeed. However, an expression having a relative date value may contain, for example, a primary component and an assumed target date. For example, the expression having a relative date value of Sunday(−1) would yield the resultant date of the nearest Sunday on or before Today's date.

Referring to FIG. 3, several types of identifiers may be used with the components such as Constants, Variables, and Symbols. Constants, Variables, and Symbols may also be used in the parameter section of a component.

Constants such as constant dates or constant numeric values are values that represent exactly the same value irrespective of anything else. The term 02/29/1972 is a constant date and always represents the same day in history. The format for constant dates is the standard U.S. format of {Month}/{Day}{Year} written as MM/DD/YYYY. The constant numeric value of 2 always represents two.

The logic block is programmed to interpret the use of a constant date in the primary component 322 or in the target date component 320 without any other modifying components to return the constant date entered. For example: if a user enters 02/29/1972 as the target date by itself or as the primary component 322, the return value is 02/29/1972. This method of entering constant dates is useful when specific dates must be targeted. The entry of 12/25/2001 might be necessary to target Christmas 2001.

Variables are values that represent different values depending upon what other information that variable is being compared with. For example, Sunday is a variable value. The use of wildcard variables in an expression in place of constant Identifiers is an effective method for identifying recurring events. Wildcards provide the user the ability to create one Identifier that will return a date, or time, relevant to the Target Date. The logic block is programmed to substitute the wildcard symbols with the TARGET day's respective values. For example, the target date component 320 may be 12/09/2002 and the primary component 322 may be ##/01#### and the # symbol is a wildcard. The resultant date is 12/01/2002. The logic block substitutes the target dates values for in the wildcard positions to generate the resultant date. Note, the last example, ##/01/##, is an easy method for identifying the first day of the "TARGET" month since the first day of every month is the always represented by 01.

Similarly, the period (.) symbols work much the same as the pound symbols with one main difference: they always return the last possible numeric value for the position that they occupy within the date or time Identifier. That is, the logic block is programmed for the period symbols return the last day of the month when used in the day place, the last month of the year (12) when used in the month place, and the last year available to the system when used in the year place, etc. For time, the period symbol returns 23 in the hour place and 59 when used in the minute or second place.

Once a resultant date is determined, then the intelligence layer may derive information from comparing the resultant date to other information. Further, the software engine may cooperate with software that is date driven such as a scheduling program, a reporting tool that retrieves information based upon the date input, or another software program that describes information as it relates to a date.

Further, the expression may have one or more date-effecting conditions associated with the expression. For example, "schedule a meeting for the first Monday of every month but not if that first Monday is a holiday." The intelligence layer decodes the date portion of the expression as well as the condition associated with the expression. The first portion of the expression "schedule a meeting for the first Monday of every month is a function of the resolving the date portion of the expression. The second portion of the expression, "but not if that first Monday is a holiday," is a date effecting condition applied to the expression. The intelligence layer makes a comparison to see if the resultant first Monday falls on a holiday. If so, the condition is satisfied. Date effecting conditions may be supplied by the user or stored in the database. Date effecting conditions may be conditions or rules that the resultant date is compared to and when compounded with another expression automatically change the resultant date. Similarly, a date effecting condition can block an action from being taken if the date effecting condition is not satisfied.

Another portion of the expression may be added, for example "In the case of a holiday on the first Monday schedule the meeting for the next day," to compound two expressions. In the compounding of the two expressions, the target date of the second condition is the resultant date of the first expression and modifies the resultant date if the date effecting condition is true.

A date effecting condition may be a comparison using operators such as Boolean operators, mathematical operators, relational operators, defined conditions, pattern operators, or string operators, which if found to be satisfied then modify the resultant date. Actions such as deriving information, retrieving information, etc. may then be taken based upon the modified resultant date.

For another example of a date-effecting condition associated with an expression, in the expression TODAY=LEAPDAY, the intelligence layer decodes the expression and condition to asks the question is Today a Leap day. The intelligence layer returns a True only if in fact the equation is evaluated on the 29th of February.

In the above example, the "=" symbol is used to compare Today's date and the nearest calendar leap day. This symbol is called a relational operator. As noted above, the intelligence layer may decode many different types of operators when resolving an equation.

Referring to FIG. 1, the following list some examples of relational operators 138 stored in the database 110.

| Relational Operators | Description | Example | Example's Return Value |
|---|---|---|---|
| < | Used to compare one Identifier to another. Returns TRUE if the Identifier on the left is LESS THAN the Identifier on the right. | 01/01/2001<01/31/2001 | TRUE |
|  |  | SUNDAY<SUNDAY | FALSE |
| > | Used to compare one Identifier to another. Returns TRUE if the Identifier on the left is GREATER THAN the Identifier on the right. | 01/01/2001>01/31/2001 | FALSE |
|  |  | SUNDAY>SUNDAY | FALSE |
| <= | Used to compare one Identifier to another. Returns TRUE if the Identifier on the left is LESS THAN OR EQUAL TO the Identifier on the right. | 01/01/2001<=06/15/1999 | FALSE |
|  |  | SUNDAY<=SUNDAY | TRUE |
| >= | Used to compare one Identifier to another. Returns TRUE if the Identifier on the left is GREATER THAN OR EQUAL TO the Identifier on the right. | 01/01/2001>=06/15/1999 | TRUE |
|  |  | SUNDAY>=SUNDAY | TRUE |
| = | Used to compare one Identifier to another. Returns TRUE if the two Identifiers are EQUAL. | 01/01/2001=021/02/2001 | TRUE |
|  |  | TRUE = FALSE | FALSE |
| <> | Used to compare one Identifier to another. Returns TRUE if the two Identifiers are NOT EQUAL. | SUNDAY <> FRIDAY | TRUE |
|  |  | FALSE <> FALSE | FALSE |

The following list some examples of defined variables 136 stored in the database 110. Some defined variables are words that explicitly or implicitly convey date information. The words may be commonly used date implying words or very application specific date imply words. Defined variables may also be variables that are defined other than words such as symbols, etc.

The DAY Identifier returns the day of the month of the target day. *(TARGET)DAY returns the calendar day of the month for the target day.

The DAYOFWEEK Identifier returns a numerical value that reflects the day of the week for the target day. For this Identifier, numbering starts on Sunday (1) and ends on Saturday (7). For example, "*(07/04/1776)DAYOFWEEK" returns that the original Independence Day was a Thursday, the $5^{th}$ day of the week.

The SHIFTDURATION Identifier returns the number of hours included in the target shift. For example, SHIFTDURATION returns a value of 8, assuming that the target shift is eight hours long.

An ALIAS Identifier represents a predefined expression under an alias. The Alias stores the predefined expression in the database with a more user-friendly name. For example, the numeric segmenting component, "^01/01/####,3 months, 1," which yields the resultant date segment of the first three months of whatever the target date's year is may be substituted in an expression under an Alias as the words "first quarter."

The SPECIALDAYS Identifier asks the question: "Is the target day a specified special day?" This Identifier accepts a numerical parameter specifying the special day. The Identifier returns TRUE if the target day is the special day and FALSE if it is not.

The SHIFTWORKING Identifier asks the question: "Is the identified shift a working shift?" This Identifier accepts a numerical parameter specifying the shift group. The Identifier returns TRUE if the identified shift is a working shift, of the specified group, and FALSE if it is not.

The PAYROLLSTART Identifier returns the date that the target day's payroll period began (forward or back, depending on the parameter).

The PAYROLLEND Identifier returns the date the target day's payroll period ends (forward or back, depending on the parameter).

For employees that fall under the Fair Labor Standards Act(FLSA), the FLSASTART Identifier returns the date the target day's FLSA period ends (forward or back, depending on the parameter).

The SHIFTPATTERNDAY Identifier returns the most recent shift day for the given target shift (forward or back, depending on the parameter).

The following list some examples of mathematical operators 144 stored in the database 110. Math operators such as multiply divide, truncate, round, etc.

The database 110 may store Boolean operators 140, such as AND, OR, NOR, XOR, etc., to be used in a date effecting condition for the comparison.

The database 110 may store pattern and string operators 142 for comparison against the resultant date. An example pattern operator may be, "PATTERN(01/01/1990, 'SMTWtFS')='S' & [MONTH=6|MONTH=7|MONTH=8]." The logic block decodes this expression as determine if target is a Weekend in the summer (June, July, or August). The pattern and string operators are constructed and resolved similar to the segmenting component.

The software engine 100 may merge two or more expression by forming a compounded expression. The two or more expressions are typically incorporated into a larger more complex expression. The two or more expressions are each resolved and then utilized to yield a resultant date.

Figure 5A:
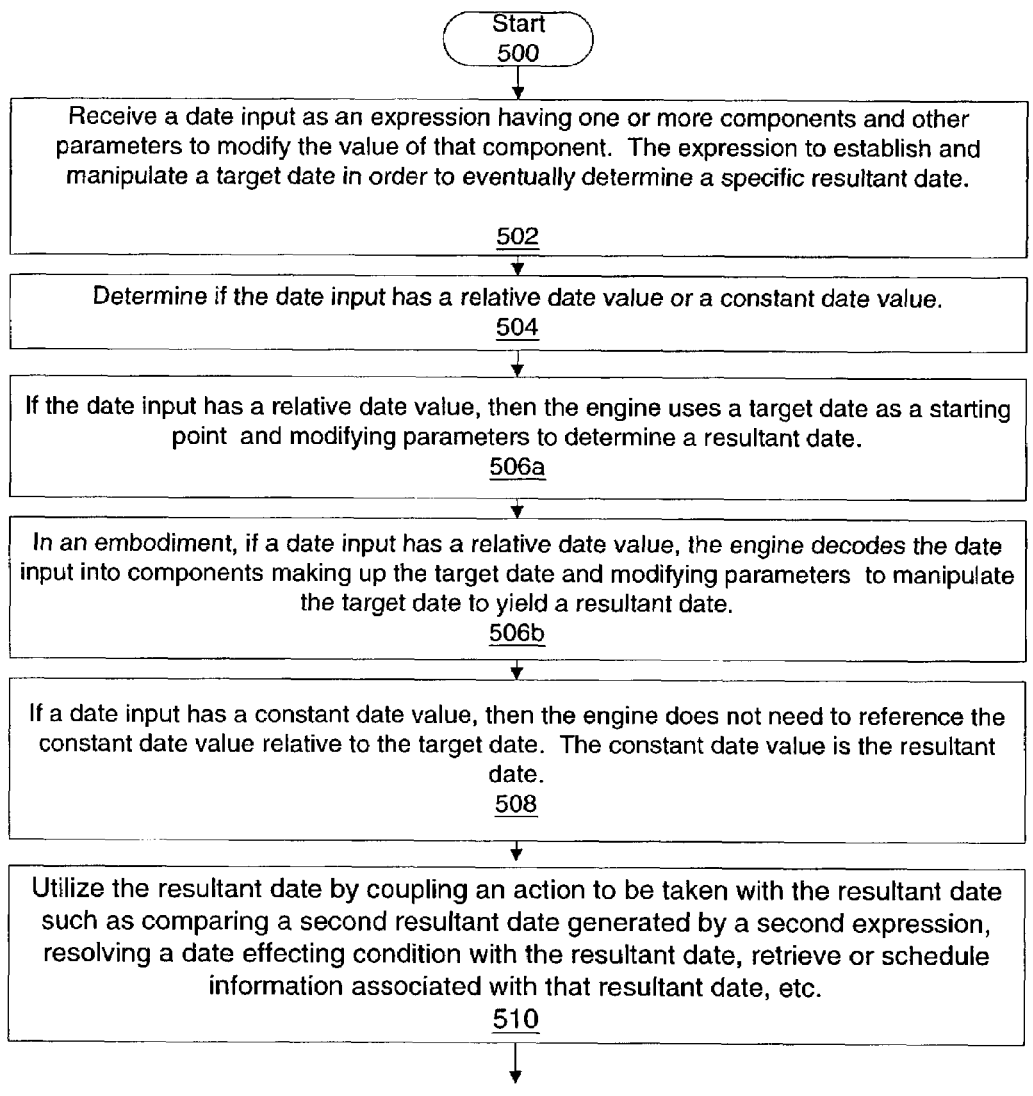

FIGS. 5a and 5b illustrate an exemplary flow diagram to establish a resultant date based upon an expression having one or more components and corresponding parameters that modify the value of the components and then taking an action based upon the resultant date.

In block 502, the software engine receives a date input as an expression having one or more components and other parameters to modify the value of that component. The expression establishes and manipulates a target date in order to eventually determine a specific resultant date.

In block 504, the software engine determines if the expression in the date input has a relative date value or a constant date value.

In blocks 506a and 506b, if the date input has a relative date value, then the engine uses a target date as a starting point and uses modifying parameters to determine a resultant date. In an embodiment, if the expression giving the date input has a relative date value, then the engine decodes the date input into components making up the starting point and modifying parameters to manipulate the starting point to yield a resultant date.

In block 508, the software engine determines that if a date input has a constant date value, then the constant date value is the resultant date.

In block 510, the software engine utilizes the resultant date by coupling an action to be taken with the resultant date such as comparing a second resultant date generated by a second expression, resolving a date effecting condition with the resultant date, retrieve or schedule information associated with that resultant date, etc.

In block 512, the software engine determines if a date-effecting condition is associated with the date input. Different types of date-effecting conditions may exist. The software engine compares the resultant date against the date-effecting condition.

In block 514, the software engine compares the resultant date against any date-effecting conditions. Typically, the comparison yields a true false result. The software engine may then take an action based upon that comparison, if the date-effecting condition is satisfied. For example, "schedule a meeting for the first Monday of every month but not if that first Monday is a holiday. If Monday is a holiday schedule the meeting for the next day." If the condition, "but not Monday is a holiday" the resultant date is modified to yield the Tuesday after the holiday.

In block 516, the software engine either directly or indirectly through a cooperating software program schedules events to occur based upon the resultant date or potentially modified resultant date.

In block 518, the software engine either directly or indirectly through a cooperating software program retrieves information associated with the resultant date or potentially modified resultant date.

In block 520, the software engine either directly or indirectly through a cooperating software program derives information from the comparing the resultant date or potentially modified resultant date with other information.

In block 522, the software engine stores this first resultant date for later use such as comparing with a second date, or retrieving a stored resultant date for a comparison.

In block 524, the software engine resolves compounded expressions. Multiple expressions may be merged into a single expression allowing very complex date driven tasks with many different date-effecting conditions to be automatically performed.

In block 526, the software engine may store a user-defined expression under an Alias for future use in a final expression that contains a set of two or more individual expressions. For example, Presidential Inauguration Day can be defined in an expression as "*(##/##/####+3years^(01/20/1994,4 years)) WEEKDAY(1)," but saved and used under the word Alias of Presidential Inauguration Day. Note, the logic decodes the expression as the 20th of January of the year following presidential election year but not if the 20th is a Sunday, then Inauguration Day is the 21st of January.

In one embodiment, the instructions used to facilitate the software engine can be embodied onto a machine-readable medium. A machine-readable storage medium includes any mechanism that provides (e.g., stores) information in a form readable by a machine (e.g., a computer). For example, a machine-readable storage medium includes read only memory (ROM); random access memory (RAM); magnetic disk storage media; optical disk storage media; flash memory devices; DVD's, EPROMs, EEPROMs, FLASH, magnetic or optical cards, or any type of media suitable for storing electronic instructions. Slower mediums could be cached to a faster, more practical, medium.

In an embodiment, any of the logic described above consists of electronic circuits that follow the rules of Boolean Logic, software that contain patterns of instructions, or any combination of both.

Figure 6:
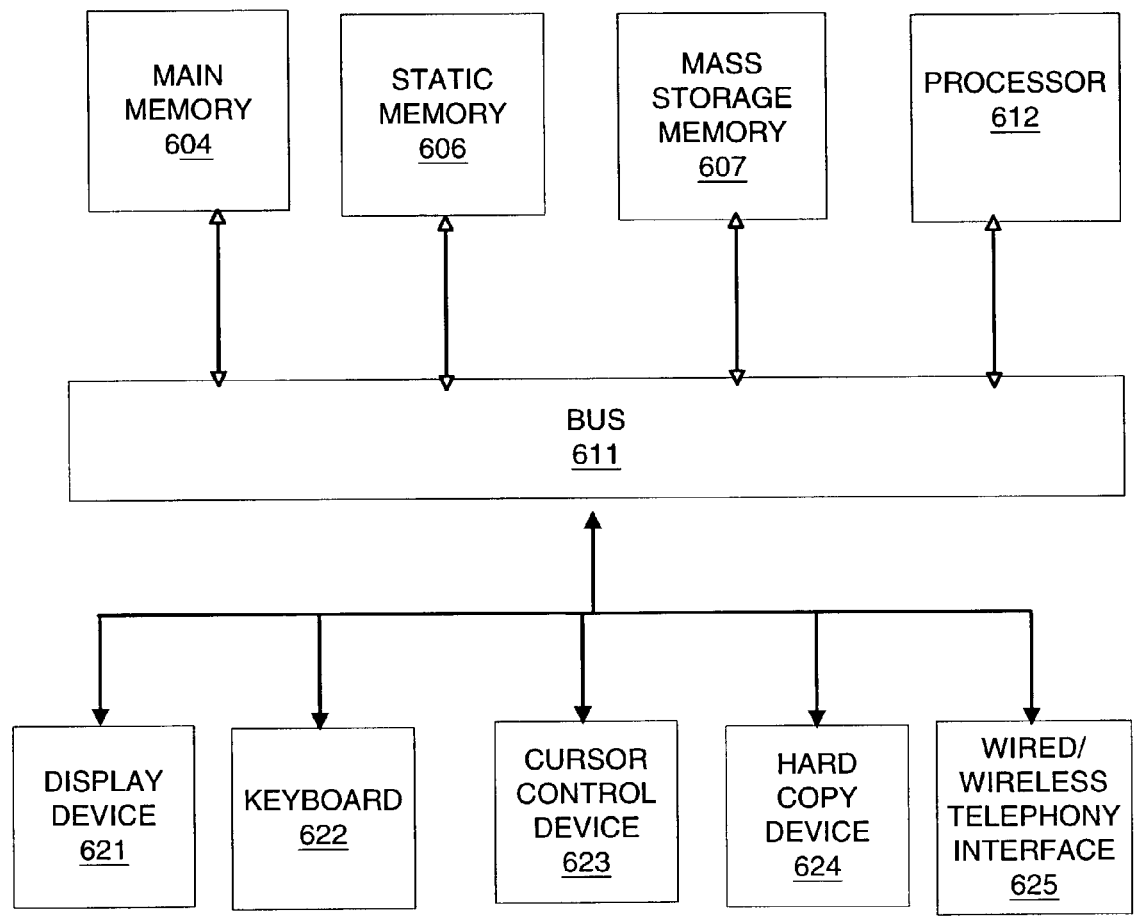
FIG. 6 illustrates a block diagram of an exemplary computer system that may use an embodiment of a machine-readable medium that provides instructions, which when executed by a machine, cause the machine to perform operations based upon a resultant date.

FIG. 6 illustrates a block diagram of an exemplary computer system that may use an embodiment of a machine-readable medium that provides instructions, which when executed by a machine, cause the machine to perform operations based upon a resultant date. In one embodiment, computer system 600 comprises a communication mechanism or bus 611 for communicating information, and an integrated circuit component such as a processor 612 coupled with bus 611 for processing information. In an embodiment, the Processor 612 may include a microprocessor, but is not limited to a microprocessor.

Computer system 600 further comprises a random access memory (RAM), or other dynamic storage device 604 (referred to as main memory) coupled to bus 611 for storing information and instructions to be executed by processor 612. Main memory 604 also may be used for storing temporary variables or other intermediate information during execution of instructions by processor 612. One or more of the components in the computer system 600 such as the Main memory 604, Static memory 606, a disk in the mass storage memory 607, contains the instructions to perform operations based upon a resultant date.

Computer system 600 also comprises a read only memory (ROM) and/or other static storage device 606 coupled to bus 611 for storing static information and instructions for processor 612, and a mass storage memory 607, such as a magnetic disk or optical disk and its corresponding disk drive. Mass storage memory 607 is coupled to bus 611 for storing information and instructions.

Computer system 600 may further be coupled to a display device 621, such as a cathode ray tube (CRT) or liquid crystal display (LCD), coupled to bus 611 for displaying information to a computer user. An alphanumeric input device (keyboard) 622, including alphanumeric and other keys, may also be coupled to bus 611 for communicating information and command selections to processor 612. An additional user input device is cursor control device 623, such as a mouse, trackball, trackpad, stylus, or cursor direction keys, coupled to bus 611 for communicating direction information and command selections to processor 612, and for controlling cursor movement on a display device 612.

Another device that may be coupled to bus 611 is a hard copy device 624, which may be used for printing instructions, data, or other information on a medium such as paper, film, or similar types of media. Furthermore, a sound recording and playback device, such as a speaker and/or microphone (not shown) may optionally be coupled to bus 611 for audio interfacing with computer system 600. Another device that may be coupled to bus 611 is a wired/wireless communication capability 625 to communication to a phone.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While some specific embodiments of the invention have been shown the invention is not to be limited to these embodiments. For example, the logic block may be programmed to interpret the use of a constant or variable time. Further different actions provide different types of targets such as a target date or target action. The expression providing the date input may be in a different form. The invention is to be understood as not limited by the specific embodiments described herein, but only by scope of the appended claims.

Appendix

[0089] Attached is an exemplary computer language to cooperate with the software engine, to be stored on the machine-readable medium, etc.

Dynamic Dates (DyD's)

Dynamic Arguments:

[0090] In mathematics, we use mathematical sentences to define values. A math sentence is generally comprised of constants, variables, and symbols, which are all interpreted into a process, which then leads to an answer.

[0091] For example: "1 + 2" is a mathematical sentence. This sentence takes the two *constants* "1" and "2" and the addition symbol "+" to define the process, "add 2 to 1", which can then be interpreted into the answer: 3.

[0092] "2 + $x$" is also a mathematical sentence. This example takes one *constant*, "2," and one *variable*, "$x$," and the addition symbol "+" to define the process "add $x$ to 2."

[0093] Similarly, we can use logical sentences that will evaluate to a value. We define these logical sentences as a Dynamic Arguments (*DyA's*). The answer derived from any DyA is referred to as the DyA's <u>*return value*</u>. The <u>*return value*</u> can then be further interpreted into a decision, which can later be used to apply rules.

[0094] We can then further divide DyA's into two categories. These categories are based solely on the type of return value: date *return* values (e.g., 01/31/1999) and non-date *return* values (e.g., 2). What then is a Dynamic Date (DyD)? A *DyD is* any expression (logical sentence) that returns *exactly one <u>Date</u>*.

[0095] Non-date returning DyA's are used in DyC's, which will be covered in depth in the next chapter. In this chapter we will only be working with *date returning DyA's* – more correctly termed DyD's.

[0096] Sometimes DyD's are only one word long. For example: "*TODAY*" is a logical sentence that gives us today's date. Other times these logical sentences can be more complex. The DyD "*TODAY+1day*" gives us tomorrow's date.

[0097] We use the word "*Dynamic*" because DyD's will give us different dates, under different circumstances. The old adage "today is yesterday's tomorrow" is a classic example of how relative time can change our desired answers.

Components: Building Blocks of DyD's

[0098] Every DyD is composed of one or more components. Each component has a specific effect in how a DyD's return value is evaluated and, therefore, each component has a designated name.

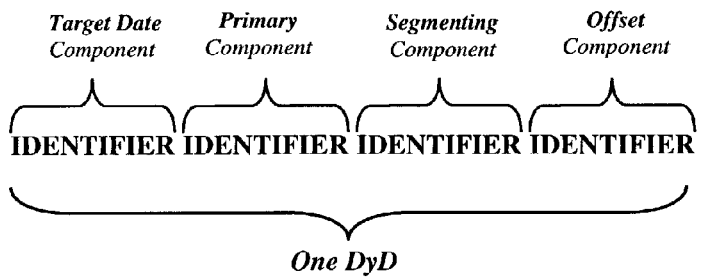

[0099] The diagram above shows an illustration of a DyD using the four types of components: Target Date, Primary, Segmenting, and Offset. The specifics of each type of component will be covered later. DyD's are built by using one or more of the four types of available components and, in general, these components are evaluated from left to right.

Identifiers: the Essential Elements of Components

[00100] For each component, there is exactly one Identifier. The Identifier contained in a component defines either constant values, variable values, or functions to be performed. The following sections describe the three types of Identifiers.

Constants

[00101] A constant is a character, or group of characters, that always revaluates the same value. The character "1" is a constant: it always returns the value of "one."

[00102] Similarly, the character group "01/01/1990" is a constant: it always returns the same date, *January 1, 1990;* regardless of the day on which the constant is evaluated or any other changing event.

Variables

[00103] A variable is a character, or group of characters, that evaluates to an amount that can never be considered constant.

[00104] The term "TODAY" must be considered a variable since it will return a different calendar date depending on which day it is used. The term "SUNDAY" is also considered a variable since it could accurately be used to define any Sunday, past, present or future. The word SUNDAY, by itself, cannot be interpreted into a specific date.

[00105] Symbols

[00106] The special symbols used as Identifiers in components define specific functions to be performed before evaluating the DyD for its return value. These *Symbol Identifiers* and their corresponding functions will be covered in more depth later.

[00107] Purpose of DyD's

[00108] At the beginning of this chapter we used the example DyD "TODAY+1day" to demonstrate the use of a logical sentence. This DyD uses both a constant "1day" and a variable "TODAY" to derive its return value. The power of using DyD's, especially with the use of variables, is their ability to return different values, based on the changing input of the variables they contain. This dynamic property will allow you to create single DyD's that will return accurate results under changing conditions.

[00109] For example: DyD's can be created which will always return the last day of the current month or return the last month in the current year.

[00110] A DyD, like the above, might be use to schedule the beginning or end of a pay period, or describe the first Sunday of a month. In any case, DyD's provide you the ability to define a "rule" once, and get the right answer always.

Targets and Segmenting Time

[00111] Before we look in depth at how to create DyD's, you should first have a basic understanding of the two key concepts the system uses to interpret DyD's. They are Targets and Segmenting Time

[00112] Targets

[00113] Targets are initial values, supplied by the system, to be used as starting points or comparisons in DyD's. Targets are always provided, but are not always required for use.

[00114] It is also important to note that different actions provide different types of targets.

[00115] Target Date

[00116] Target Date is the most common target. The Target Date is the date the system uses to start its interpretation of DyD's. The Target Date is the date supplied by the system or by other functions, which will be used as the initial starting point for the DyD's you provide. It is important to note that the Target Date is a *constant date*, a single specific date including an exact day, month and year (e.g., 10/14/1947).

[00117] If not explicitly defined, the Target Date default is the current system date (TODAY).

[00118] Other Targets...

[00119] Targets other than Target Date are less common and, as stated above, are dependent upon the action being taken. For example: if you are performing actions on shifts, you should expect a given "Target Shift." If you are performing actions regarding units, you could expect to receive a "Target Unit" as well as a "Target Date" and other targets.

[00120] Segmenting Time

[00121] The idea of segmenting time is actually an easy concept to grasp: taking a range of time and dividing it up into smaller units. This is accomplished by first defining the range of time (e.g., the month of February) and then defining the segmenting interval (e.g., Sundays). A diagram of this example could look like this:

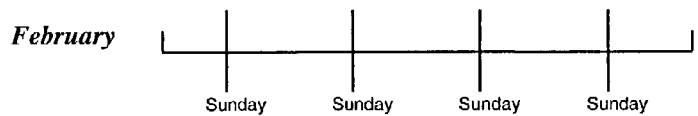

[00122] If we think of these time segments as steps used to traverse the given time range, then we can also think of the Target Date as *the* starting point. If the given Target Date were the second Friday of the month of February then our diagram would then look like this:

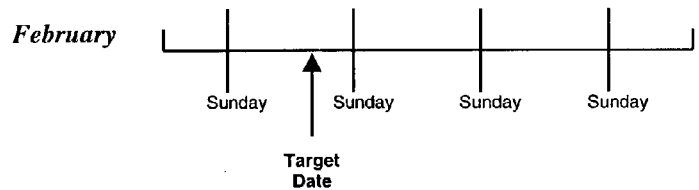

[00123] From the given Target Date, we can now traverse the month of February by stepping through the Sunday segments.

[00124] The DyD "SUNDAY(+1)", in our example, would start at our Target Date and then traverse to the next Sunday.

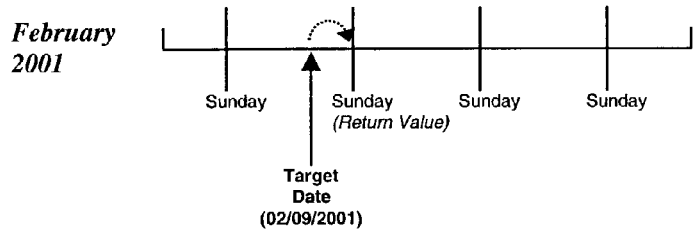

[00125] The Target Date, in this case, is a constant date representing the second Friday of February 2001. The segmenting was implied by the use of the word Sunday, while the DyD "SUNDAY(+1)" defined the process "Sunday plus one" or, "the next Sunday."

Creating DyD's

[00126] Syntax

[00127] Syntax is the correct and ordered arrangement of the terms contained in a DyD. Syntax is important. For example: the mathematical expression "1 + 2 + 3" is understandable; however, the improper arrangement of the same Identifiers "2 3 + 1 +" is quite confusing. For this reason, proper syntax must be used in order to ensure that DyD's are understood by the system, and that the DyD's will return predictable values.

[00128] Constant Identifiers

[00129] Constant Dates

[00130] Constant Dates are values that represent exactly one date in time. The term 02/29/1972 is a constant date. The format for constant dates is the standard US format of {Month}/{Day}/{Year} written as MM/DD/YYYY.

[00131] The use of a constant date in a DyD ignores the supplied Target Date and always returns the constant date entered. For example: if you enter 02/29/1972, the return value is 02/29/1972 00:00:00.

[00132] This method of entering constant dates is necessary when specific dates must be targeted, regardless of any supplied Target Date. The entry of 12/25/2001 might be necessary to target Christmas 2001. Constant dates can also be used to define a beginning or ending period, as we will see later.

[00133] Constant Times

[00134] Like constant dates, constant times are numeric values that represent exactly one moment in any day. The term 15:02:17 is a constant time. The format for constant times is the 24-hour format of {hours}:{minutes}:{seconds} written as HH:MM:SS. The use of a constant time ignores the current system time or the supplied time and always returns the constant time entered.

[00135] This method of entering constant times is necessary when specific times must be referenced. The entry of 08:00:00 might be necessary to target the beginning of a shift.

[00136] It should be noted that when a time is entered without a date, the Target Date is assumed and added to the return value.

[00137] Wildcards

[00138] The use of wildcards in DyD's in place of constant Identifiers is an effective method for identifying recurring events. Wildcards provide you the ability to create one Identifier that will return a date, or time, relevant to the Target Date (e.g., Christmas).

[00139] It is important to note that although the use of wildcards in a DyD results in a constant date or constant time return value; Identifiers containing the pound wildcard symbols are themselves not constants. They are, in fact, variable dates since their return values will change based upon the supplied Target Date.

[00140] The two wildcard symbols are the pound-symbol (##) and the period (..). Correct syntax is to use two repeating symbols when "wildcarding" either the month, day, hours, minutes, or seconds, and to use four repeating symbols when "wildcarding" the year. Also, you may use one type of wildcard in one field (e.g., day) and another to "wildcard" a different field (e.g., month), but do not mix the use of the symbols in the same field (e.g., "#.")

[00141] The pound symbols, when used, replace the numeric characters in the constant date/time format. The system substitutes the pound symbols with the TARGET day's respective values. For times, the system substitutes the pound symbol with the current system time's value.

[00142] Some examples are given below to clarify the use of the ## symbol.

| System Time | Entered Identifier | Return Value |
|---|---|---|
| 10:04:58 | ##:00:00 | 10:00:00 |
| 10:04:58 | 12:##:00 | 12:04:00 |
| 10:04:58 | 12:00:## | 12:00:58 |
| 10:04:58 | ##:##:## | 10:04:58 |

| Target Date | Entered Identifier | Return Value |
|---|---|---|
| 0<u>1</u>/01/2001 | ##/05/1999 | <u>01</u>/05/1999 |
| 01/<u>01</u>/2001 | 12/##/1999 | 12/<u>01</u>/1999 |
| 01/01/<u>2001</u> | 12/05/#### | 12/05/<u>2001</u> |
| 01/01/<u>2001</u> | ##/01/#### | <u>01</u>/01/<u>2001</u> |

[00143] The last example, ##/01/##, is the accepted method for identifying the first day of the "TARGET" month since the first day of every month is the always the first. However, the ability to target the last day of the month cannot be accomplished using just the ## symbols. For this task, we must use the .. symbols.

[00144] The period (..) symbols work much the same as the pound symbols with one main difference: they always return the <u>last</u> possible numeric value for the position that they occupy within the date or time Identifier. That is, the period symbols return the last day of the month when used in the day place, the last month of the year (12) when used in the month place, and the last year available to the system (2999) when used in the year place. For time, the period symbol returns 23 in the hour place and 59 when used in the minute or second place.

[00145] The period symbols will be primarily used in the day place since all other ending values are always the same.

| System Time | Entered Identifier | Return Value |
|---|---|---|
| 10:04:58 | ..:00:00 | <u>23</u>:00:00 |
| 10:<u>04</u>:58 | 12:..:00 | 12:<u>59</u>:00 |
| 10:04:<u>58</u> | 12:00:.. | 12:00:<u>59</u> |
| 10:<u>04:58</u> | ..:..:.. | <u>23:59:59</u> |

| Target Date | Entered Identifier | Return Value |
|---|---|---|
| 01/01/2001 | ../05/1999 | 12/05/1999 |
| 01/01/2001 | 12/../1999 | 12/31/1999 |
| 01/01/2001 | 12/05/.... | 12/05/2999 |
| 02/01/2000 | 02/../2000 | 02/29/2000 |
| 01/01/2001 | ##/../#### | 01/31/2001 |

[00146] The last example, ##/../####, is the accepted method for identifying the last day of the target month and is the primary purpose of the period symbols.

[00147] Variable Identifiers

[00148] TODAY

[00149] There are other ways of identifying days besides the use of constant dates and wildcards. The use of the Identifier TODAY is a good example.

[00150] The Identifier TODAY, by itself, can be a complete Identifier; it will always return today's date, based on the computer's system time. If you enter TODAY on February 14, 2005, the return value will be 02/14/2005. Target Date is ignored when using the TODAY Identifier.

[00151] Days of the Week

[00152] The days of the week (e.g., SUNDAY, MONDAY, TUESDAY, etc.) are also legal Identifiers that can be complete DyD's by themselves. However, before we show some examples, you should first understand how the system uses these Identifiers to retrieve return values.

[00153] Unlike TODAY, which can alone be interpreted directly into a constant date, the Identifier SUNDAY is too ambiguous by itself to be interpreted into a constant date. There may be as many as five Sundays in any given month and thousands of Sundays in the system's available 4000 - year span.

[00154] For this reason, the system uses the provided Target Date when evaluating Days of the Week Identifiers in DyD's. The Target Date, as discussed earlier, tells the system where to *start* its search. For your convenience, this reference to the Target Date is assumed when you enter the DyD SUNDAY. In fact, SUNDAY is shorthand notation for the DyD *(TARGET)SUNDAY.

[00155] The "*(TARGET)" portion of this DyD tells the system to reference the nearest Sunday to the provided Target Date. (As we will see later, the "*"itself is a Symbol Identifier.) However, that's not all the system needs to know. It also needs to know whether it is to retrieve the closest Sunday *after* the Target Date or the closest Sunday *before* the Target Date.

[00156] To fulfill this requirement, the system makes one more assumption: it assumes you are looking for the first Sunday on or before the Target Date. The SUNDAY Identifier is interpreted shorthand notation for the DyD *(TARGET)SUNDAY(-1).

[00157] The "−" (minus sign) in the parenthesis means "on or before" and the "1" means "the first." Therefore, the "(-1)" portion of this DyD tells the system to locate the nearest Identifier (in this case SUNDAY) on or before the target day.

[00158] These shorthand assumptions are provided for ease of use. In later examples, we will see how they can be substituted for values that differ from the assumed values.

[00159]  Examples

[00160] The following are examples given to clarify the concept of the Target Date reference and the assumed portions of DyD's. For these examples, the Target Date is always displayed as the circled date on the shown calendar.

| *February, 2001* | | | | | | |
|---|---|---|---|---|---|---|
| S | M | T | W | T | F | S |
|  |  |  |  | 1 | 2 | 3 |
| 4 | 5 | 6 | 7 | 8 | 9 | 10 |
| 11 | 12 | 13 | 14 | 15 | 16 | 17 |
| 18 | 19 | 20 | 21 | 22 | 23 | 24 |
| 25 | 26 | 27 | 28 |  |  |  |

[00161] *Desired return value:* The first Sunday on or before the Target Date.

[00162] DyD: SUNDAY

[00163] In the above example, the return value would be 02/11/2001. The return value is the 11th because it is the first Sunday, (by default) on or before, the 14th.

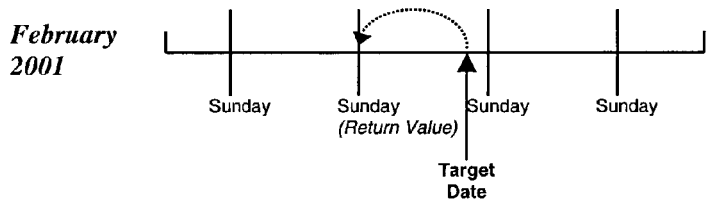

[00164] In fact, the return value will be the same date if the Target Date is the 11th, 12th, 13th, 14th, 15th, 16th, or 17th, as shown below:

| February, 2001 | | | | | | |
|---|---|---|---|---|---|---|
| S | M | T | W | T | F | S |
|  |  |  |  | 1 | 2 | 3 |
| 4 | 5 | 6 | 7 | 8 | 9 | 10 |
| 11 | 12 | 13 | 14 | 15 | 16 | 17 |
| 18 | 19 | 20 | 21 | 22 | 23 | 24 |
| 25 | 26 | 27 | 28 |  |  |  |

[00165] Using the DyD SUNDAY with any one of the above-circled Target Dates will result in the return value of 02/11/2001.

[00166] We can use the idea of segmenting time to graphically view the process.

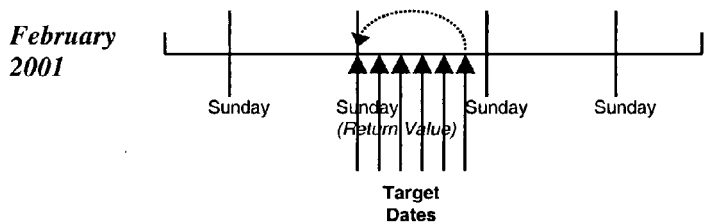

[00167] What happens if the Target Date is changed to the 20th using the same DyD SUNDAY.

| February, 2001 | | | | | | |
|---|---|---|---|---|---|---|
| S | M | T | W | T | F | S |
|  |  |  |  | 1 | 2 | 3 |
| 4 | 5 | 6 | 7 | 8 | 9 | 10 |
| 11 | 12 | 13 | 14 | 15 | 16 | 17 |
| 18 | 19 | 20 | 21 | 22 | 23 | 24 |
| 25 | 26 | 27 | 28 |  |  |  |
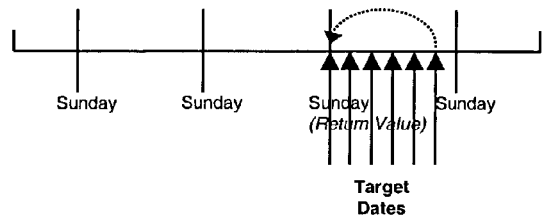
[00168] The first Sunday, on or before the 20$^{th}$ is now the 18$^{th}$ of February. 02/18/2001 would be the new return value. In fact, as above, the return value of 02/18/2001 would be returned for *any* date inclusive between the 18$^{th}$ and the 24$^{th}$ of this February.

DyD Components

[00169] If you recall, a DyD is composed of one or more components. Components, in return, are composed of exactly one Identifier. The following diagram illustrates the above construction definition:

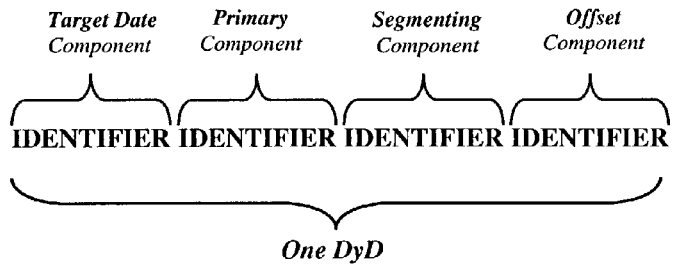

[00170] Parameters

[00171] Identifiers, as you have seen, can be better defined by placing information within parenthesis after the Identifier itself. In the DyD "SUNDAY(1)," for example, SUNDAY is the Identifier while (1) is its *parameter*.

[00172] A *parameter* tells the system under what circumstances the Identifier should be used. It is important to note that different Identifiers accept different type parameters (see the "Parameter Type" column in the Identifier listing at the end of this chapter). Some Identifiers even accept more than one parameter, while constants do not accept any. Also, just because an Identifier accepts a parameter does not mean it is required. Remember, too, that there are three types of Identifiers: Constants, Variables, and Symbols. With this further understanding of Identifiers and their parameters, we can now more accurately illustrate the construction of a DyD:

[00173] *(Note: the Offset component does not use parenthesis to delimit its parameters.*

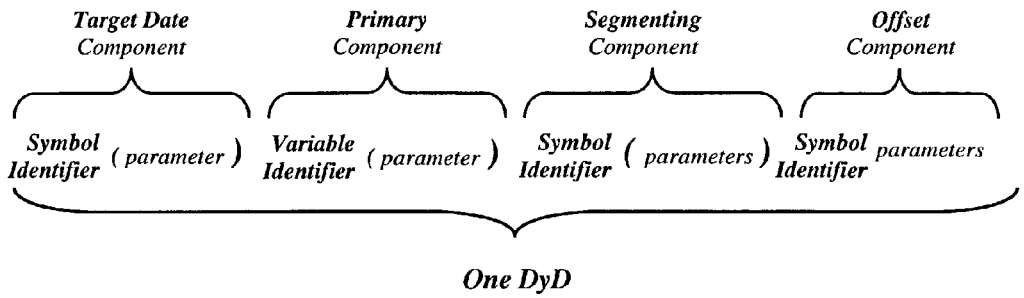

One DyD

*Parameters for some Identifiers are not always required.*

Component Types

[00174] Now that we know that a component is comprised of one Identifier and its corresponding parameters, if any, lets look at the types of components available for construction within date returning DyD's.

[00175] Primary Component

[00176] The primary component is the main component In the DyD "*(MONDAY)SUNDAY(-1)," SUNDAY(-1) is the primary component.

[00177] You can always recognize the primary component: it is the only component without a Symbol Identifier and it is never contained in parenthesis. That is, it is not being used in another Identifier's parameter. In the above example, MONDAY is a *variable* Identifier, but it is being used as the "*" Identifier's parameter. The variable Identifier SUNDAY is, therefore, the primary Component only; it is the only variable Identifier not contained in parenthesis.

[00178] The Primary component can accept one parameter: the *Occurrence* parameter. The Occurrence parameter, as demonstrated, determines which "occurrence" of the named Identifier will be returned. The Occurrence parameter must evaluate to a positive or negative number, such as "-1". When used, the (-1) means: "the first on or before." However, you don't have to use the assumed Occurrence value when you use Identifiers; you can add our own. In fact, unless you do want "the first on or before," you *must* specify a different occurrence parameter.

[00179] In addition to using the minus symbol to signify "on or before," you can also use the plus symbol "+" to signify "on or after." Where the "1" in the parameter signified "the first" occurrence, you can also use any numeric value to signify the $n^{th}$ occurrence of the named Identifier.

[00180] E.g., SUNDAY(+3), for the *third* Sunday – on or after.

[00181] The following are examples that illustrate the use of a non-assumed occurrence parameters.

| February, 2001 | | | | | | |
|---|---|---|---|---|---|---|
| S | M | T | W | T | F | S |
|   |   |   |   | 1 | 2 | 3 |
| 4 | 5 | 6 | 7 | 8 | 9 | 10 |
| 11 | 12 | 13 | 14 | 15 | 16 | 17 |
| 18 | 19 | 20 | 21 | 22 | 23 | 24 |
| 25 | 26 | 27 | 28 |   |   |   |

[00182] *(TARGET)MONDAY(+1) or simply MONDAY(1) returns: 02/26/2001.
*The first Monday after the $20^{th}$.*

[00183] *(TARGET)TUESDAY(+2) or simply TUESDAY(2) returns: 02/27/2001.
*The second Tuesday after the $20^{th}$ (the $20^{th}$ itself counts as the first).*

[00184] *(TARGET)TUESDAY(-2) or simply TUESDAY(-2) returns: 02/13/2001.
*The second Tuesday before the $20^{th}$ (the $20^{th}$ itself counts as the first).*

[00185] *(TARGET)FRIDAY(-3) or simply FRIDAY(-3) returns: 02/02/2001.
*The third Friday before the $20^{th}$ (the16th is the first, the $9^{th}$ the second and the $2^{nd}$ is the third).*

[00186] Additionally, an exclamation point "!" can be added to the end of the occurrence parameter to exclude the "on" portion in the "on or after/before" definition.

[00187] For example:

| February, 2001 | | | | | | |
|---|---|---|---|---|---|---|
| S | M | T | W | T | F | S |
|  |  |  |  | 1 | 2 | 3 |
| 4 | 5 | 6 | 7 | 8 | 9 | 10 |
| 11 | 12 | 13 | 14 | 15 | 16 | 17 |
| 18 | 19 | 20 | 21 | 22 | 23 | 24 |
| 25 | 26 | 27 | 28 |  |  |  |

[00188] FRIDAY(+1!) would return the 23$^{rd}$ (the first Friday *after* the target day), while...

[00189] TUESDAY(+1!) would return the 27$^{th}$ (the first Tuesday *after* (not <u>on</u> or *after*) the target day).

[00190] Target Date Component

[00191] The Target Date component, as already used in many examples above, consists of the "*" symbol Identifier. The "*" Identifier takes one parameter that must evaluate to a date.

[00192] In fact, TARGET is the *assumed* parameter to the "*" Identifier when the Target Date component is not used (e.g., *(TARGET) assumed for the DyD SUNDAY). The "*" Identifier actually means: "*redefine the Target Date as....*" The *parameter* "(TARGET)" is then used to redefine the Target Date as "*the given Target Date.*"

[00193] In cases where the "*" Identifier is used but no parameter is specified "TODAY" is the assumed parameter (e.g., *(TODAY) assumed for the DyD "*SUNDAY"). The *assumed* parameter "(TODAY)" can then be interpreted as "*redefine the Target Date*" as "*Today's date.*"

[00194] As stated above, the Target Date is always provided for the evaluation of the DyD's. However, just because it is provided does not mean you have to use it. You can, in fact, modify the Target Date or even bypass its use altogether.

[00195] Bypassing the Supplied Target Date

[00196] By using the "*" Identifier and defining our own Target Date parameter, you can completely bypass the use of the system provided Target Date. All remaining interpretations will then be based on the date provided in the target parameter.

| February, 2001 | | | | | | |
|---|---|---|---|---|---|---|
| S | M | T | W | T | F | S |
|  |  |  |  | 1 | 2 | 3 |
| 4 | 5 | 6 | 7 | 8 | 9 | 10 |
| 11 | 12 | 13 | 14 | 15 | 16 | 17 |
| 18 | 19 | 20 | 21 | 22 | 23 | 24 |
| 25 | 26 | 27 | 28 |  |  |  |

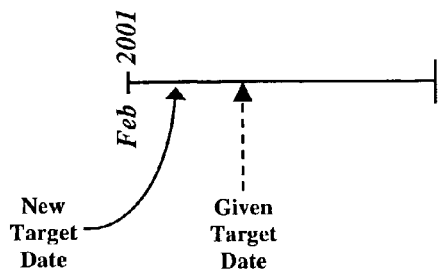

[00197] As shown above, our given Target Date is 02/09/2001.

[00198] For the example, assume our desired return value is the first Sunday in the month of February 2001 – regardless of the Target Date.

[00199] The following would allow us to receive the <u>date</u> of the first Sunday in February 2001 without having to reference a calendar:

[00200] DyD: *(02/01/2001)SUNDAY(1)

*The DyD above can be translated to mean*

"(redefine the Target Date as: 02/01/2001) [find] $1^{st}$. Sunday on or after."

[00201] When you use constant dates as parameters in the Target Date component, you explicitly redefine a *new* Target Date. The above DyD will return the date 02/04/2001, no matter what Target Date was initially supplied.

[00202] Note: The above DyD is only an example. Entering a DyD that always returns the same date, as above, slows the system down. See the "Building For Speed" section to learn more methods for building quicker DyD's.

[00203] Shifting the Target Date

[00204] The idea of shifting the Target Date is somewhat more complex. It consists of redefining the Target Date *based on the given Target Date*.

| February, 2001 | | | | | | |
|---|---|---|---|---|---|---|
| S | M | T | W | T | F | S |
|  |  |  |  | 1 | 2 | 3 |
| 4 | 5 | 6 | 7 | 8 | 9 | 10 |
| 11 | 12 | 13 | 14 | 15 | 16 | 17 |
| 18 | 19 | 20 | 21 | 22 | 23 | 24 |
| 25 | 26 | 27 | 28 |  |  |  |

[00205] On the calendar above, the DyD SUNDAY would return the constant date 02/11/01, because the system assumes the remaining Target date component to be "*(TARGET)", the 14$^{th}$ of February. It then returns the first Sunday on or before the 14$^{th}$.

[00206] If you redefine the Target Date using the "*" Identifier, you can still use the systems assumption defaults. Examine the following DyD:

[00207] *(SUNDAY)MONDAY

[00208] The MONDAY Identifier does not provide a parameter, so MONDAY(-1) is assumed. However, the Target Date parameter is provided: SUNDAY.

[00209] Since SUNDAY, is not a constant date, the system is forced to make its usual assumptions. It translates the SUNDAY, contained inside the parameter portion of the Target Date component the same way it did when SUNDAY was the only Identifier entered: *(TARGET)SUNDAY(-1). This new assumed value is then used as the Target Date component.

[00210] The DyD, in whole, is then assumed the following:

[00211] *(*(TARGET)SUNDAY(-1))MONDAY(-1)

[00212] But, wait! We said a component could only contain one Identifier. It appears as though the Target Date component contains two or even three Identifiers: *, TARGET, and SUNDAY. *(*(TARGET)SUNDAY(-1)). To clarify this confusing point, lets breakdown the Target Date component.

[00213] As you can see in the illustration above, the first "*" is considered to be the only Identifier in the Target Date component. *Everything else is considered to be the *'s parameter — even if the parameter contains, what would otherwise be considered, Identifiers.*

[00214] The parameter is, as you might have guessed, a DyD in and of itself. This inside DyD follows the same rules as other DyD: it contains its own components, and evaluates to a return value. It is this evaluated return value, for the inside DyD, that is eventually used as the *new* Target Date — since it is used as the Target Dates parameter.

[00215] For clarity, the following steps illustrate how the system uses the above DyD to find the return value.

[00216] *(*(TARGET)SUNDAY(-1))MONDAY(-1)

[00217] *(*(02/14/2001)SUNDAY(-1))MONDAY(-1)

"TARGET" *is replaced with the initially supplied Target Date, given on the example calendar (above).*

[00218] *(02/11/2001)MONDAY(-1)

"*(02/14/2001)SUNDAY(-1)" *is replaced with the first Sunday on or before the 14th. This is the initial return value and is the constant date used to* redefine *the Target Date from 02/14/2001 to 02/11/2001. The Target Date has now been redefined!*

[00219] 02/05/2001

"*(02/11/2001)MONDAY(-1)" *is replaced with the first Monday on or before the 11$^{th}$. This is the final and actual return value.*

[00220] As shown, the system works from the inside, out; adjusting and shifting the Target Date until the final result is found. The technique is called nesting and can theoretically be accomplished an infinite number of times. The following is a ludicrous but syntactically correct DyD to prove the point:

[00221] *(*(*(*(*(SUNDAY)SUNDAY)SUNDAY)SUNDAY)SUNDAY)SUNDAY)SUNDAY

[00222] The above DyD actually evaluates to the same return value as just SUNDAY since, after the initial *(SUNDAY) all remaining SUNDAY's default to the "on" portion of the "on or before" definition of the assumed (-1) offset parameter.

[00223] Shifting the Target Date when Using a Constant Primary Component

[00224] It should be noted that redefining the Target Date, when using a constant date as the primary Component, has no effect on the final return value; the DyD will always return just the constant date Identifier. For example:

[00225] *(01/01/2001)12/25/2001 returns: 12/25/2001

[00226] This DyD is like saying: find the nearest occurrence of the date 12/25/2001 nearest to the Target Date 01/01/2001. Since there is only one 12/25/2001 is history, it does not matter what the Target Date is; it will always return the only *one* date available: 12/25/2001.

[00227] Offset Component

[00228] The Offset component is used to "*offset*" the previous components value. This component is signified by the use of the Symbol Identifiers of "+" or "−."

[00229] The unique feature of the Offset component is its lack of parenthesis to signify its one mandatory parameter. This feature has been built into the language to make DyD's easier to write and read. Here's how the offset component works:

[00230] A constant numerical value (e.g., 1, 7, 31), followed by a measurement of time (e.g., years, months, weeks, days, hours, minutes, and seconds), is used as a parameter to the offset's Identifier. The measurement term is always singular when the # is equal to one (e.g., 1year), and always plural when the # is greater than one (e.g., 2year*s*).

[00231] Although the offset component can never be used without any other components, namely the primary component, below are some examples of offset components in correct syntax:

+1day

-6months

+1week

-2weeks

The following examples demonstrate all the provided time measurement terms and their results when used to "*Offset*" the primary component.

year/years

TODAY+1year returns: 06/21/2002

*Assuming that TODAY is 06/21/2001.*

12/05/1991+10years returns: 12/05/2001

*Adds 10 years to the constant date 12/05/1991.* month/months

TODAY+1month returns: 06/21/2002

*Assuming that TODAY is 05/21/2002.*

03/05/2001+3months returns: 06/05/2001

*Adds 3 months to the constant date 03/05/2001.* week/weeks

TODAY-1week returns: 06/17/2002

*Assuming that TODAY is 06/24/2002.*

12/05/2001+2weeks returns: 12/19/2001

*Adds 14 days to the constant date 12/29/2001.* day/days

:##:##+1day returns: 01/01/2002 12:07:00

*Assuming that the Target Date is 12/31/2001 and the system time (at evaluation) was 12:07:00.*

SUNDAY+5days returns: 05/25/2001

*Assuming the Target Date is 05/24/2001; 5 days after the first Sunday (5/20/2001) on or before 5/24/2001.* hour/hours

TODAY+1hour returns: 07/04/2001 1:00:00

*Assuming that TODAY is 07/04/2001, adds 1 hour to the assumed time of 00:00:00 O'clock.*

09:30:00+4hours returns: 13:30:00

*Adds 4 hours to 09:30:00.* minute/minutes

:00:00+1minute returns: 07:01:00

*Adds 1 minute to the present time, assuming the present time is 07:00:00.*

09:30:00+40minutes returns: 10:10:00

*Adds 40 minutes to 09:30:00.* second/seconds

07:00:00+1second returns: 07:00:01

*Adds 1 second to 7 O'clock.*

09:30:00+25seconds returns: 09:30:25

*Adds 25 seconds to 09:30:00.*

Notice that in the day/days and hour/hours examples, the modifiers adjust dates with time and time with date. This is legal, but always returns a <u>date and time</u> value. A date without a time will results in a date and time: the time portion is assumed. The same is true for time only entries; their corresponding dates will be assumed. For date only values, the default time is assumed to be 00:00:00 (12:00 AM). In fact, the term "date" or "date return value" always assumes the inclusion time.

It should also be noted that the offset component can be used more than once consecutively. In these cases, the offsets are all applied to the same component. For example:

SUNDAY+1month-1week+1day

The above example is a legal DyD: It takes the return value for SUNDAY and adds 1month, then subtracts one week, and then adds one day.

[00232] Segmenting Component

[00233] The segmenting component is characterized by the use of the "^" Symbol Identifier and accepts three parameters. The first parameter defines the date from which segmenting will be based on or started. The second parameter is the same as used above in the offset component; the third is an Occurrence parameter.

[00234] The Segmenting component is used to explicitly segment time based on the given parameters and the date returned by the preceding component. In other words, the segmenting component uses the date returned by its first parameter to define a starting period. It then segments time into intervals defined in its second parameter, and then returns the $n^{th}$ Occurrence (based on the Occurrence parameter) from the date returned by the previous component (the component just left of the Segmenting component).

[00235] Like the offset component, the Segmenting component cannot be used alone, since it is dependent on a reference date defined by a previous component. However, below are some examples of lone Segmenting components in correct syntax:

^(02/01/2001,14days,-1)

^(NOW,1month,2)

^(*(01/01/####)MONDAY,3weeks,5)

[00236] Admittedly, the concept of the Segmenting component is somewhat complex. Therefore it, as well as explicit segmenting, will be covered in detail in later sections. (See Advanced Segmenting).

Component Diagram

[00237] As you can see, each type of component is distinguishable by the type of identifier it contains.

[00238] The Variable or Constant identifier with no Symbol Identifier is the primary component.

[00239] If there is an * Symbol Identifier, there is a Target Date component.

[00240] If there is a + or - Symbol Identifier, there is an Offset component.

[00241] If there is a ^ Symbol Identifier, there is a Segmenting component.

[00242] That's why they are named identifiers – they identify their corresponding components. The following diagram illustrates the composition of a DyD using all four types of components:

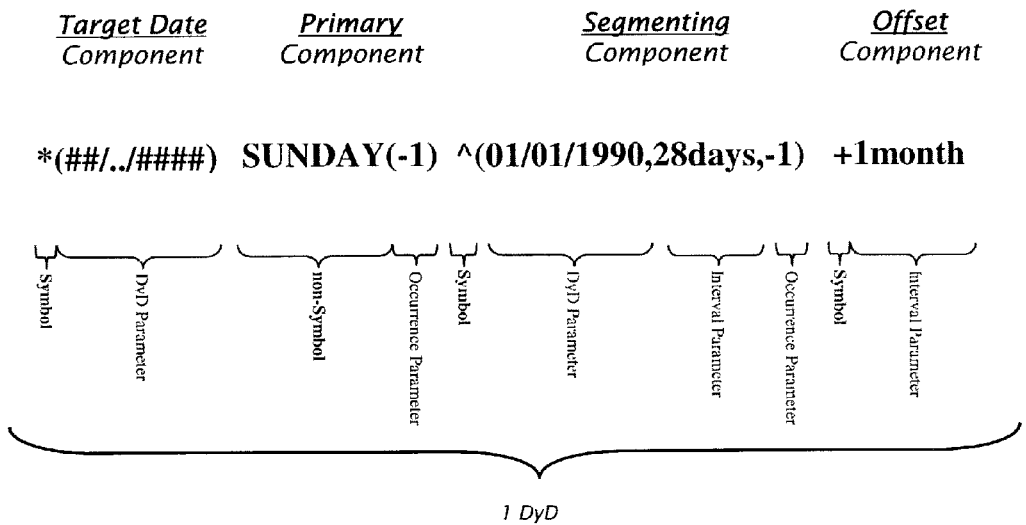

More DyD Identifiers

[00243] Now that you understand components, especially the use of the primary and Target Date components, lets look at some additional Identifiers that you can use. These new Identifier can be used to expand your ability to define a Target Date, or used to more definitively retrieve a desired return value.

[00244] As you've seen in the above examples: constant dates, TODAY, TARGET, and the days of the week are all legal Identifiers. Proper syntax for these, and other variable Identifiers is in UPPERCASE.

[00245] Using the calendar below, the following examples will illustrate the use the rest of the legal Identifiers used in DyD's:

| *February, 2001* | | | | | | |
|---|---|---|---|---|---|---|
| S | M | T | W | T | F | S |
|   |   |   |   | 1 | 2 | 3 |
| 4 | 5 | 6 | 7 | 8 | 9 | 10 |
| 11 | 12 | 13 | 14 | 15 | 16 | 17 |
| 18 | 19 | 20 | 21 | 22 | 23 | 24 |
| 25 | 26 | 27 | 28 |   |   |   |

[00246] LEAPDAY({number})

[00247] The LEAPDAY Identifier returns the date of the nearest leap-day (forward or back, depending on the parameter) from the target day.

[00248] *(TARGET)LEAPDAY(-1) or LEAPDAY returns: 02/29/2000.

*The first leap-day on or before the target day.*

[00249] *(01/01/3000)LEAPDAY(1) returns: 02/29/3004.

*The first lead-day on or after the turn of the next millennium.*

[00250] SPECIALDAY({number})

[00251] The SPECIALDAY Identifier returns the date defined special day. The number uniquely defines one special day, but that defined special day may be a variable day, such as 12/25/####. This example would define Christmas of target days year. Use of the special day Identifier includes a parameter that indicates the assigned number of the desired SPECIALDAY.

| February, 2001 | | | | | | |
|---|---|---|---|---|---|---|
| S | M | T | W | T | F | S |
|  |  |  |  | 1 | 2 | 3 |
| 4 | 5 | 6 | 7 | 8 | 9 | 10 |
| 11 | 12 | 13 | 14 | 15 | 16 | 17 |
| 18 | 19 | 20 | 21 | 22 | 23 | 24 |
| 25 | 26 | 27 | 28 |  |  |  |

[00252] *The grayed box indicates a defined "special day" uniquely defined the number 12.*

[00253] **\*(TARGET)SPECIALDAY(12) or SPECIALDAY(12) returns: 02/14/2001.**

*The first special day (assigned as 12) on or before the target day.*

[00254] **\*(02/01/2001) SPECIALDAY(12) returns: 02/14/2001.**

*The first #12 special day on or before the redirected target day.*

[00255] PAYROLLSTART({number})

[00256] The PAYROLLSTART Identifier returns the date the target day's payroll period began (forward or back, depending on the parameter).

| February, 2001 | | | | | | |
|---|---|---|---|---|---|---|
| S | M | T | W | T | F | S |
|  |  |  |  | 1 | 2 | 3 |
| 4 | 5 | 6 | 7 | 8 | 9 | 10 |
| 11 | 12 | 13 | 14 | 15 | 16 | 17 |
| 18 | 19 | 20 | 21 | 22 | 23 | 24 |
| 25 | 26 | 27 | 28 |  |  |  |

[00257] *The grayed boxes indicate a defined payroll period ($1^{st} - 15^{th}$).*
*The un-grayed boxes also indicate a defined payroll period ($16^{th} - 28^{th}$).*

[00258] **\*(TARGET)PAYROLLSTART(-1) or PAYROLLSTART returns: 02/01/2001.**

*The first payroll start day on or before the target day.*

[00259] *(02/22/2001) PAYROLLSTART (-2) returns: 02/01/2001.

*The second payroll start day on or before the redirected target day. (The first on or before the 22$^{nd}$ would be the 16$^{th}$).*

[00260] PAYROLLEND({number})

[00261] The PAYROLLEND Identifier returns the date the target day's payroll period ends (forward or back, depending on the parameter).

| February, 2001 | | | | | | |
|---|---|---|---|---|---|---|
| S | M | T | W | T | F | S |
|  |  |  |  | 1 | 2 | 3 |
| 4 | 5 | 6 | 7 | 8 | 9 | 10 |
| 11 | 12 | 13 | 14 | 15 | 16 | 17 |
| 18 | 19 | 20 | 21 | 22 | 23 | 24 |
| 25 | 26 | 27 | 28 |  |  |  |

[00262] *The grayed boxes indicate a defined payroll period ($1^{st}$ – $15^{th}$).*
*The un-grayed boxes also indicate a defined payroll period ($16^{th}$ – $28^{th}$).*

[00263] *(TARGET)PAYROLLEND(1) or PAYROLLEND returns: 02/15/2001.

*The first payroll end day on or after the target day. Note that the default parameter is the first on or after (1), not the first on or before (-1).*

[00264] *(01/30/2001) PAYROLLEND (3) returns: 02/28/2001.

*The third payroll end day on or after the redirected target day. (The first on or after Jan 30$^{th}$ would be Jan 31$^{st}$, the second, Feb 15$^{th}$).*

[00265] FLSASTART({number})

[00266] For employees that fall under the Fair Labor Standards Act(FLSA), the FLSASTART Identifier returns the date the target day's FLSA period ends (forward or back, depending on the parameter).

| February, 2001 | | | | | | |
|---|---|---|---|---|---|---|
| S | M | T | W | T | F | S |
|  |  |  |  | 1 | 2 | 3 |
| 4 | 5 | 6 | 7 | 8 | 9 | 10 |
| 11 | 12 | 13 | 14 | 15 | 16 | 17 |
| 18 | 19 | 20 | 21 | 22 | 23 | 24 |
| 25 | 26 | 27 | 28 |  |  |  |

[00267] The grayed boxes indicate a defined FLSA period ($1^{st} - 15^{th}$).
The un-grayed boxes also indicate a defined FLSA period ($16^{th} - 28^{th}$).

[00268] *(TARGET)FLSASTART(-1) or FLSASTART returns: 02/01/2001.
The first FLSA start day on or before the target day.

[00269] *(02/22/2001) FLSASTART (-2) returns: 02/01/2001.
The second FLSA start day on or before the redirected target day. (The first on or before the $22^{nd}$ would be the $16^{th}$).

[00270]    FLSAEND({number})

[00271] The FLSAEND Identifier returns the date the target day's FLSA period ends (forward or back, depending on the parameter). The FLSAEND Identifier takes the normal *numerical* type parameter to determine "$n^{th}$ on or before" or "$n^{th}$ on or after."

| February, 2001 | | | | | | |
|---|---|---|---|---|---|---|
| S | M | T | W | T | F | S |
|  |  |  |  | 1 | 2 | 3 |
| 4 | 5 | 6 | 7 | 8 | 9 | 10 |
| 11 | 12 | 13 | 14 | 15 | 16 | 17 |
| 18 | 19 | 20 | 21 | 22 | 23 | 24 |
| 25 | 26 | 27 | 28 |  |  |  |

[00272] The grayed boxes indicate a defined FLSA period ($1^{st} - 15^{th}$).
The un-grayed boxes also indicate an FLSA payroll period ($16^{th} - 28^{th}$).

[00273] *(TARGET)FLSAEND(1) or FLSAEND returns: 02/15/2001.

*The first FLSA end day on or after the target day. Note that the default parameter is the first on or after (1), not the first on or before (-1).*

[00274] *(01/30/2001) FLSAEND (3) returns: 02/28/2001.

*The third FLSA end day on or after the redirected target day. (The first on or after Jan $30^{th}$ would be Jan $31^{st}$, the second, Feb $15^{th}$).*

[00275] SHIFTPATTERNDAY({number})

[00276] The SHIFTPATTERNDAY Identifier returns the most recent shift day for the given target shift (forward or back, depending on the parameter).

| February, 2001 | | | | | | |
|---|---|---|---|---|---|---|
| S | M | T | W | T | F | S |
|   |   |   |   | 1 | 2 | 3 |
| 4 | 5 | 6 | 7 | 8 | 9 | 10 |
| 11 | 12 | 13 | 14 | 15 | 16 | 17 |
| 18 | 19 | 20 | 21 | 22 | 23 | 24 |
| 25 | 26 | 27 | 28 |   |   |   |

[00277] *The grayed boxes indicate scheduled shift days.*
*The Target date is circled in black.*

[00278] *(TARGET)SHIFTPATTERNDAY(1) or SHIFTPATTERNDAY returns: 02/10/2001.

*The first working shift day on or after the target day.*

[00279] *(01/30/2001)SHIFTPATTERNDAY(3) returns: 02/05/2001.

*The third working shift day on or after the redirected target day. (The first on or after Jan $30^{th}$ would be Feb $1^{st}$, the second, Feb $3^{rd}$).*

[00280] SHIFTDAY({number})

[00281] The SHIFTDAY Identifier returns the most recent *working* shift day for the target persons shift (forward or back, depending on the parameter).

| February, 2001 | | | | | | |
|---|---|---|---|---|---|---|
| S | M | T | W | T | F | S |
|  |  |  |  | 1 | 2 | 3 |
| 4 | 5 | 6 | 7 | 8 | 9 | 10 |
| 11 | 12 | 13 | 14 | 15 | 16 | 17 |
| 18 | 19 | 20 | 21 | 22 | 23 | 24 |
| 25 | 26 | 27 | 28 |  |  |  |

*The grayed boxes indicate scheduled working shift days.*
*The Target date is circled in black.*

[00282] *(TARGET)SHIFTDAY(1) or SHIFTDAY returns: 02/10/2001.

*The first working shift day on or after the target day.*

[00283] *(01/30/2001)SHIFTDAY(3) returns: 02/05/2001.

*The third working shift day on or after the redirected target day. (The first on or after Jan $30^{th}$ would be Feb $1^{st}$, the second, Feb $3^{rd}$).*

[00284] Identifiers That Return Non-Assumed Times

[00285] The following Identifiers return not only constant dates, but also constant, non-assumed, times. Date return values are usually associated with date events that are time sensitive (e.g., the start day and time of a certain shift).

[00286] <LITERAL DATE & TIME>

[00287] Like a literal date, a literal date & time is a value that represents exactly one moment in time. The term 07/20/1969 16:18:00 is a constant date & time. The format for constant dates is the entry of a standard date and the entry of a standard time with the addition of a blank space separating the two entries (e.g. 07/20/1969 16:18:00).

➢ 09/14/1939 12:00:00 returns: 09/14/1939 12:00:00.

*The constant date and time of the entry.*

➢ 02/27/1994 21:00:00 returns: 02/27/1994 21:00:00.

*The constant date and time of the entry.*

[00288] When wild cards or variable identifiers are used in the entry, the two entries must be separated by the "@" symbol.

> TODAY@12:00:00 returns: 09/14/1939 12:00:00.

*Assuming Today is 09/14/1939, Today's Date and the constant time of 12:00:00.*

> ##/##/####@##:##:## returns: 02/27/1994 21:00:00.

*Assuming the Target Date is 02/27/1994 and the current system time is 21:00:00.*

[00289] The "@" symbol will also parse out the date of the entry on its left (even if it contains a time) and parse out the time of the entry to its right (even if it contains a date).

> TODAY@NOW returns: 09/14/1939 12:00:00.

*Assuming Today is 09/14/1939 and assuming the current system time is 12:00:00. The date portion of "NOW" is not used for evaluation.*

> NOW@TODAY returns: 02/27/1994 00:00:00.

*Assuming that NOW is 02/27/1994 11:37:25. The date portion of NOW is used to evaluate the date return value, but the identifier today does not include a time –default time must therefore be used: 00:00:00 (the assumed time for the TODAY identifier is 00:00:00)*

> <u>02/27/1990</u> 12:34:45@06/06/1944 <u>16:00:21</u> returns: 02/27/1994 16:00:21

> *The underlined portions (above) are used to evaluate the return value: The date from the constant date-time on the <u>left</u> of the "@" symbol and the time from the constant date-time on the <u>right</u> of the "@" symbol.*

Note: the "@" symbol cannot be used in any parameter (e.g., the Target Date component's parameter). However, if you wish to redefine the Target Date with a variable date time you can do so by nesting a Target Date component (with the date portion) inside the Target Date component. For example:

*(06/06/1944@16:00:00)SUNDAY is <u>not</u> a valid DyD.

Instead, use...

*(*(06/06/1944)16:00:00)SUNDAY. A valid DyD that returns 06/04/1944 16:00:00.

[00290] *Remember, a time (16:00:00) used with out a specified date assumes the use of the Target Date for its return value. In this case it is the inner redefined Target Date of 06/06/1944.*

[00291] The use of a literal date & time bypasses the supplied Target Date and always returns the constant date & time entered. This method of entering literal dates & times is necessary when specific dates with times must be targeted, regardless of any supplied Target Date. The entry of 07/25/2002 09:00:00 might be necessary to target a date and time for the start of a action. Below are some further examples.

[00292] NOW

[00293] The "NOW" Identifier returns the current date (as with the TODAY Identifier) along with the current system time. This function is not affected by the Target Date, nor can a Target Date be redefined for "current" type Identifiers such as NOW or TODAY.

[00294] NOW returns: 02/14/2001 15:17:52:00.

*Assuming that it was evaluated on Feb 14th, 2001 at 15:17:52:00.*

[00295] END

[00296] The END Identifier returns the date and time value that represents the end of the target action.

[00297] END returns: 03/13/2003 17:00:00.

*Assuming the action ends at 03/13/2003 17:00:00.*

[00298] START

[00299] The START Identifier returns the date and time value that represents the start of the target action.

[00300] START returns: 03/13/2003 8:00:00.

*Assuming the action starts at 03/13/2003 8:00:00.*

[00301] SHIFTEND

[00302] The SHIFTEND Identifier returns the date and time value that represents the end of the target shift.

[00303] SHIFTEND returns: 03/13/2003 17:00:00.

*Assuming that shift ends at 03/13/2003 17:00:00.*

[00304] SHIFTSTART

[00305] The SHIFTSTART Identifier returns the date and time value that represents the start of the target shift.

[00306] SHIFTSTART returns: 03/13/2003 8:00:00.

*Assuming that shift starts at 03/13/2003 8:00:00.*

Advanced Segmenting

[00307] As covered before, the idea of segmenting time is taking a range of time and partitioning it into sections. This is accomplished by first defining the range of time or a starting point, and then defining the segmenting interval. The time segments are then used as steps to travel through time.

[00308] Time Segmenting Identifiers

[00309] Time segmenting Identifiers are the actual Identifiers used to segment time. A time segmenting Identifier is any *variable* Identifier that results in a date, time, or date and time return value. Constant Identifiers alone are never time segmenting Identifiers because they only define one moment in time. Constant Identifiers can, however, be used to define the start of a segmented time range. Wildcard dates and times, constant dates or times containing the pound wildcard symbols (e.g., ##), are variable Identifiers and therefore are time segmenting Identifiers. Below are some examples of segmenting and non-segmenting Identifiers.

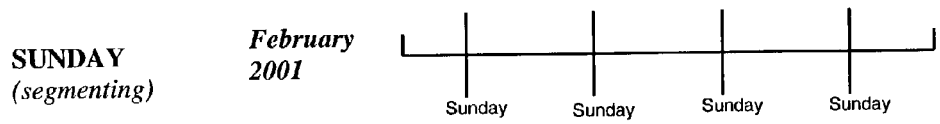

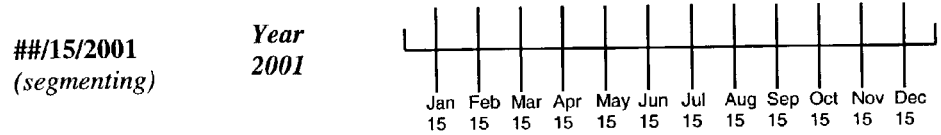

02/../2001      *Year*
*(non-segmenting)*      *2001*

*Always represents
the constant date (Feb 28, 2001)*

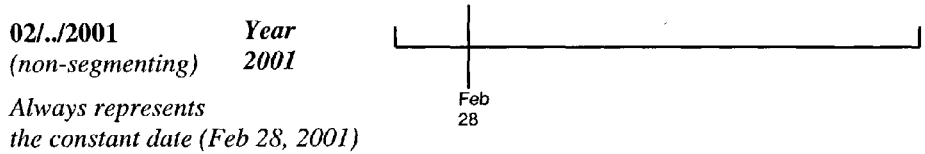

[00310] The Segmenting Component: Explicit Segmenting

[00311] Up to now, all of the segmenting Identifiers covered have been predefined Identifiers (e.g., SUNDAY). However, there is a method for defining your own segmenting intervals. Using this method you can custom define any time segment length, as well as The ^ symbol is the segmenting Symbol Identifier. It identifies the presence of the segmenting component, and is used to define an explicit time segment. As covered in the components section, it accepts three parameters.

[00312] The first parameter, like the Target Date component's parameter, is a DyD; it must evaluate to a specific date. This date is used to define where the segmenting should begin. This parameter is completely independent of any other evaluation, namely the Target Date component. That is, any redefinition of the Target Date (by the Target Date component outside the segmenting component) will not effect any reference to the Target Date in this $1^{st}$ parameter.

[00313] The second parameter is the same as used, in the offset component. It is a number value followed by a measurement of time (e.g., 2months). This parameter is segmenting interval. It defines the distance between the intervals. If this parameter is not included, it is assumed to be "14days."

[00314] The third parameter is the same as used in the primary component: It is a positive or negative number value that states that the return value should be the $n^{th}$ occurrence, forward or back, depending on the positive or negative value, respectively. If this parameter is not included, it is assumed to be "-1."

[00315] Finally, the date returned by the component previous to the segmenting component is used as the reference (starting point) in the time segment. It is from this starting point that the offset will step, by the defined intervals, to the segmenting components final return value.

[00316] The following is the correct syntax for using the Segmenting Component:

[00317] {*COMPONENT (Reference Date)*}^(*Start Date(DyD), Interval, Occurrence*)

- E.g., 02/14/2001^(01/01/2001,1week,1!)

[00318] COMPONENT: The moment in time that the segmenting will begin on, <u>as evaluated by the previous component.</u> This component is usually, but not necessarily, the primary component. The ending date is always assumed to be *infinity* (i.e., the furthest date forward available to the system).

[00319] Start Date (DyD): A valid DyD that will return the date from which the segmenting will begin.

[00320] Interval: the size of the segments. The "interval" parameter uses any legal math modifier (see "Math with Identifiers").

[00321] Occurrence: the $n^{th}$ occurrence "on or before" / "on or after." This Identifier has exactly the same purpose and function as when used in date Identifiers (e.g., SUNDAY(1)).

[00322] The following illustrations walk through the step used to evaluate the segmenting components return value:

[00323] Define the Segmenting: Starting on the date specified by the $1^{st}$ parameter, segment time by intervals specified by the $2^{nd}$ parameter.

[00324]  08/25/2001^(01/01/2001,3months, 2)
[00325]

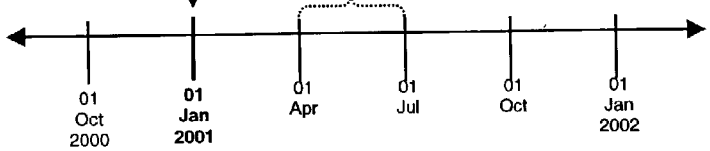

[00326] 2. ) Enter the time segment at the date returned by the previous component.

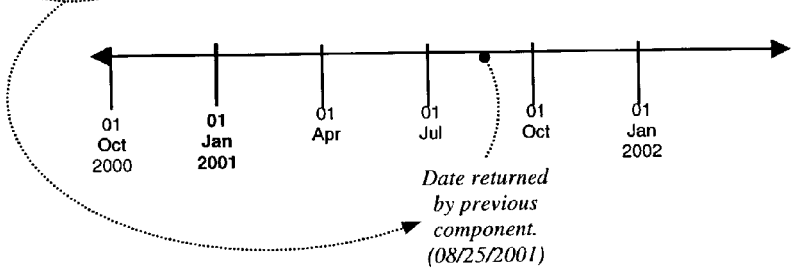

[00327] From the entered date, "jump" the number of segments specified by the $3^{rd}$ (Occurrence) parameter: This is the return value for the segmenting component.

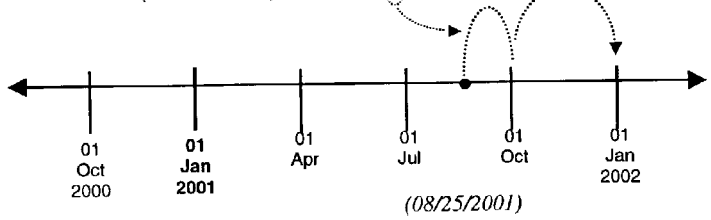

[00328] Return Value: 01/01/2002

[00329] Summary: Starting on the $1^{st}$ of January ($1^{st}$ parameter), segment time every 3months ($2^{nd}$ parameter). Then, return the second occurrence (3rd parameter) of <u>one of the time segments</u> – after the reference date (date returned by previous component).

[00330] More Examples
01/31/2001+3days^(01/01/2001,14days,-1)
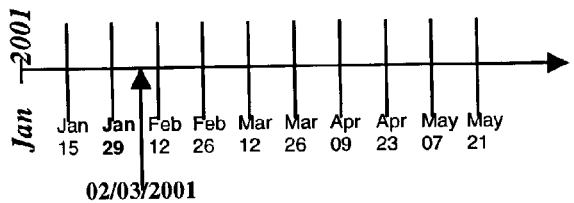
Return Value: 01/29/2001
*01/29/2001 is the first segment on or before the date returned by the previous component (02/03/2001).*
02/03/2001 12:30:00^(01/01/2001,8hours,1)
Return Value: 01/29/2001 16:00:00
*The first segment on or after the date-time returned by the previous component.*
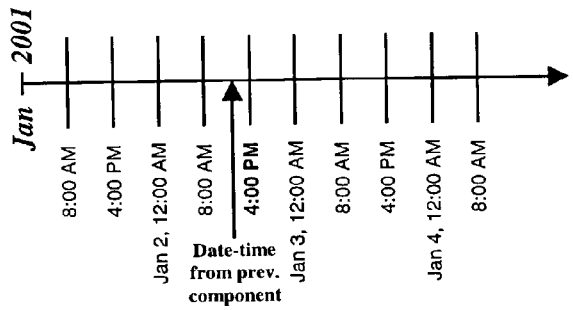
[00331]  *(05/01/2001)TARGET^(01/01/2001,14days)

(given Target Date = 02/03/2001)

Return Value: 04/23/2001
*The first segment on or before (assumed Occurrence of "-1") the redefined target of 05/01/2001.*

*(The given Target Date is ignored)*

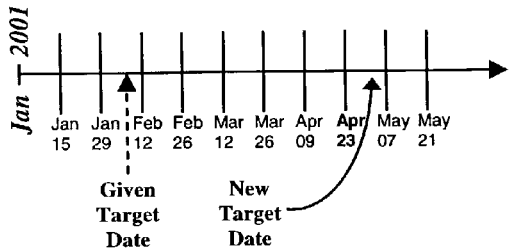

Subsequent and Preceding Return Values

[00332] On some occasions, it may be necessary to return the "next" subsequent return value or the "next" preceding return value. For this discussion, the "next" subsequent return value simply refers to the next possible *future* return value a DyD would return based on some future target date, while the "next" preceding return value refers to the first previous return value a DyD would return based on some past target date. The idea is similar, in function and in use, to using the occurrence parameter, but differs in its ability to be employed by parent controls. More importantly, the use of the "%" symbol removes ambiguity in complex DyD expressions when the hosting application attempts to find the next or previous occurrence of a DyD. For example:

*(##/../####)WEEKDAY

[00333] The above DyD clearly represents the last weekday of the target month. What the "next" return value should be, however, is not so clear. Should the "next" return value be the next subsequent weekday following the given return value (the first weekday following the last weekday of the target month), or should the "next" return value be the last weekday of the next month (the last weekday of the month, after the target month)? Since it cannot be clearly determined what the "next" return value should be, the DyD is considered, in this regard, ambiguous.

[00334] In most cases, the above DyD would desirably represent the last weekday of a given month, and therefore the "next" value should be the last weekday of the month after the target month. To clarify this ambiguity to the system, the user must use the "%" symbol to specify which component(s) should be used as the basis for determining the "next" return value. The correct usage of the "%" symbol would therefore look like this:

*(##/../####(%0))WEEKDAY

[00335] The above DyD will not only correctly return the last weekday of the target month, but also correctly return any Subsequent or Preceding values needed by the hosting system for evaluation. The "%" symbol indicates that "next" should mean next *month* not next *weekday*.

[00336] For clarification, the following DyD illustrates how one would create a DyD who's "next" return value would be the next subsequent weekday following the given return value (the first weekday following the last weekday of the target month):

*(##/../####)WEEKDAY(%0)

Here the "%" symbol indicates that "next" should mean next *weekday* not next *month*.

[00337] If the hosting system is required to evaluate the "next" return value when no "%" symbol has been employed, the system makes the following assumptions: If the DyD contains a Segmenting component, the occurrence parameter in that segmenting component only is assumed to contain the "%" symbol and evaluation takes place as specified above. If the DyD contains no segmenting component, the "%" symbol is assumed to be contained in the Primary component's occurrence parameter. In either case, if the affected component does not contain an occurrence parameter (e.g., SUNDAY) then the affected component is assumed to have the occurrence parameter of "(%0)" and evaluations are made as described above.

[00338] Although this document is well beyond describing hosting applications or controls that utilize DyDs, it is well worth pointing out that the one of the main purposes of the "%" symbol is to allow parent controls the ability to let the user scroll through subsequent and previous return values. In such cases the DyD would be designed containing the "%" symbol(s) and the scrolling control would automatically evaluate Subsequent or Preceding return values base on the depth of the scroll. The ability to scroll through return values allows the user to compare *expected* return values with *actual* return values for future and past target dates.

Dynamic Conditions (DyC's)

DyC's

[00339] In the previous chapter, we examined only date returning DyA's and their corresponding Identifiers. In fact, the idea of returning anything but a date may seem useless until you understand the concept of DyC and their ability to compare two DyA's. That's what a DyC is: Two DyA's compared to each other.

[00340] Because a DyC is, in the end, just a comparison, it can only have one of two possible return values: True or False. This is so because, the comparison is interpreted as a "yes" or "no" question; they then return that answer in the form or *True* for "yes," or *False* for no. Lets look at an example:

[00341] 7 = 8

[00342] The above is actually an acceptable DyC: it is the comparison of 7 to 8. To more easily understand how the system interprets this comparison, simply add the word "*is*" before the DyC and then ask yourself the resulting question:

[00343] *is* 7 = 8

[00344] The answer is, of course, no. The system's answer for no is the term "*False*": The return value for the DyC "7=8" is FALSE. Using this same method, we can compare not only two numerical value, but also two variable dates. For example:

[00345] TODAY = LEAPDAY

[00346] This DyC asks the question *is* Today a Leap day. The DyC will return *True* only if it is evaluated on the 29$^{th}$ of February.

[00347] In the above example, the "="symbol is used to compare Today's date and the nearest calendar leap day. This symbol is called a Relational operator. The "=" Relational operator essentially asks whether the two given values are equal to each other. But the "="symbol is not the only Relational operator available for our use; there are, additionally, other types of comparisons we can make using other operators. The following is a table of the available relational operators and there use:

| Relational Operators | Description | Example | Example's Return Value |
|---|---|---|---|
| < | Used to compare one Identifier to another. Returns TRUE if the Identifier on the left is LESS THAN the Identifier on the right. | 01/01/2001<01/31/2001<br>SUNDAY<SUNDAY | TRUE<br>FALSE |
| > | Used to compare one Identifier to another. Returns TRUE if the Identifier on the left is GREATER THAN the Identifier on the right. | 01/01/2001>01/31/2001<br>SUNDAY>SUNDAY | FALSE<br>FALSE |
| <= | Used to compare one Identifier to another. Returns TRUE if the Identifier on the left is LESS THAN OR EQUAL TO the Identifier on the right. | 01/01/2001<=06/15/1999<br>SUNDAY<=SUNDAY | FALSE<br>TRUE |
| >= | Used to compare one Identifier to another. Returns TRUE if the Identifier on the left is GREATER THAN OR EQUAL TO the Identifier on the right. | 01/01/2001>=06/15/1999<br>SUNDAY>=SUNDAY | TRUE<br>TRUE |
| = | Used to compare one Identifier to another. Returns TRUE if the two Identifiers are EQUAL. | 01/01/2001=021/02/2001<br>TRUE = FALSE | TRUE<br>FALSE |
| <> | Used to compare one Identifier to another. Returns TRUE if the two Identifiers are NOT EQUAL. | SUNDAY <> FRIDAY<br>FALSE <> FALSE | TRUE<br>FALSE |

[00348] The term *condition* to used to describe a comparison. A comparisons is used to describe a current *condition* based on the DyC's return value. Actions can then be applied only if all given conditions are *True*.

[00349] DyC Identifiers

[00350] In addition to the Identifiers covered up to this point, some Identifiers have been designed solely for use in DyC's. However, it is importantly noted that these as well as date-returning Identifiers are legal for use in DyC's. That is, all Identifiers, date-returning (DyD) or not, can be used in DyC's.

[00351] Numerical Identifiers

Numerical Identifiers are Identifiers that examine non-numerical values and return *numbers*. A Numerical Identifier can, for example, return the calendar day (e.g., 14) from a date or return the length, in hours, of a given target shift.

DAY

The DAY Identifier returns the day of the month of the target day.

**\*(TARGET)DAY or DAY returns: 14**.

*The calendar day of the month for the target day.*

**\*(06/06/1944)DAY returns: 06**.

*The calendar day of the month for the redirected target day.*

MONTH

The MONTH Identifier returns the month of the year for the target day.

**\*(TARGET)MONTH or MONTH returns: 02**.

*The calendar month of the year for the target day.*

**\*(12/07/1941)MONTH returns: 12**.

*The calendar month of the year for the redirected target day.*

YEAR

The YEAR Identifier returns the year of the target day.

**\*(TARGET)YEAR or YEAR returns: 2001**.

*The calendar year for the target day.*

**\*(12/17/1903)YEAR returns: 1903**.

*The calendar year for the redirected target day.*

DAYOFWEEK

The DAYOFWEEK Identifier returns a numerical value that reflects the day of the week for the target day. For this Identifier, numbering starts on Sunday (1) and ends on Saturday (7).

**\*(TARGET)DAYOFWEEK or DAYOFWEEK returns: 4**.

*Wednesday is the fourth day of the week. (Sunday is the first.)*

**\*(07/04/1776)DAYOFWEEK returns: 5**.

*The original Independence Day was a Thursday, the $5^{th}$ day of the week.*

REGION

The REGION Identifier returns the gray number of the target region.

REGION returns: 4.

*Assuming that the gray number of the target region is 4.*

REGION returns: 5.

*Assuming that the gray number of the target region is 5.*

AGENCY

The AGENCY Identifier returns the gray number of the target agency.

AGENCY returns: 4.

*Assuming that the gray number of the target agency is 4.*

AGENCY returns: 5.

*Assuming that the gray number of the target agency is 5.*

JOBTITLE

The JOBTITLE Identifier returns the gray number of the target job title.

JOBTITLE returns: 4.

*Assuming that the gray number of the target job title is 4.*

JOBTITLE returns: 5.

*Assuming that the gray number of the target job title is 5.*

POSITION

The POSITION Identifier returns the gray number of the target position.

POSITION returns: 4.

*Assuming that the gray number of the target position is 4.*

POSITION returns: 5.

*Assuming that the gray number of the target position is 5.*

SHIFT

The SHIFT Identifier returns the gray number of the target shift.

SHIFT returns: 4.

*Assuming that the gray number of the target shift is 4.*

SHIFT returns: 5.

*Assuming that the gray number of the target shift is 5.*

STATION

The STATION Identifier returns the gray number of the target station.

STATION returns: 4.

*Assuming that the gray number of the target station is 4.*

STATION returns: 5.

*Assuming that the gray number of the target station is 5.*

UNIT

The UNIT Identifier returns the gray number of the target unit.

UNIT returns: 4.

*Assuming that the gray number of the target unit is 4.*

UNIT returns: 5.

*Assuming that the gray number of the target unit is 5.*

SHIFTDURATION

The SHIFTDURATION Identifier returns the number of hours included in the target shift.

SHIFTDURATION returns: 4.

*Assuming that the target shift is four hours long.*

SHIFTDURATION returns: 8.

*Assuming that the target shift is eight hours long.*

DURATION

The DURATION Identifier returns the number of hours included in the target action.

DURATION returns: 4.

*Assuming that the target action is four hours long.*

DURATION returns: 8.

*Assuming that the target action is eight hours long.*

[00352] ## Math Identifiers

[00353] Math Identifiers are similar to Numerical Identifiers in that they return number constants (e.g., 4). However, unlike Numerical Identifiers that return numbers based on non-numerical values; math identifiers return numbers base on number values.

[00354] These Identifiers are required because the common syntax of numerical math, are not valid. In other words "2 x 3" or "2*3" is not acceptable. However, with the use of the included Identifiers, you are still provided the ability to multiply 2 by 3, as well as perform other Math functions.

[00355] Below is the description of each Math Identifier; all Math Identifiers require two parameters and share the same syntax: {*IDENTIFIER*}({*number1*},{*number2*})

MULTIPLY

The MULTIPLY Identifier multiplies the first parameter with the second parameter and returns the value

MULTIPLY(3,4) returns: 12

*3 times 4 is 12.*

MULTIPLY(4,5) returns: 20

*4 times 5 is 20.*

DIVIDE

The DIVIDE Identifier divides the first parameter by the second parameter and returns the resulting value.

DIVIDE(8,2) returns: 4

*8 divided by 2 is 4.*

DIVIDE(9,2) returns: 4.5

*9 divided by 2 is 4½.*

MODULO

The MODULO Identifier divides the first parameter by the second parameter and returns the remainder value. The modulo of two numbers is often used to determine if the first number is evenly divisible by the second (a modulo return value of 0).

MODULO(10,3) returns: 1

*10 divided by 3 is 3 with a remaining value of 1 left over.*

MODULO(20,11) returns: 9

*20 divided by 11 is 1 with a remaining value of 9 left over.*

MODULO(15,5) returns: 0

*15 divided by 5 is 3 with no remainder; 15 is evenly divisible by 5!*

TRUNCATE

The TRUNCATE Identifier limits the number of decimal digits contained in a number. The remaining value is not rounded up; the "extra" digits are simply removed. The first parameter is the affected number, while the second parameter determines how many decimal digits will remain in the return value.

TRUNCATE(5.45935,2) returns: 5.45

*Only the two decimal digits .45 are allowed to remain.*

TRUNCATE(3.14159,1) returns: 3.1

*Only the first decimal digit .1 is allowed to remain.*

TRUNCATE(15.555,6) returns: 15.555

*The number already contains less than 6 decimal digits; no truncation takes place.*

ROUND

The ROUND Identifier also limits the number of decimal digits contained in a number. However, the remaining value *is* rounded up. The first parameter is the effected number, while the second parameter determines how many decimal digits will remain in the return value.

ROUND(5.45935,2) returns: 5.46

*Only the two decimal digits are allowed to remain; the .45 is rounded up to .46*

ROUND(3.14159,1) returns: 3.1

*Only the first decimal digit is allowed to remain; the .1 is rounded up.*

ROUND(15.555,6) returns: 15.555

*The number already contains less than 6 decimal digits: no rounding takes place.*

[00356] ## Boolean Identifiers

[00357] Boolean Identifiers are Identifiers that return either *True* or *False*. As with the DyC itself, these Identifiers essentially ask a relative "yes" or "no" question, regarding a given condition, and then return that answer in the form or *True* for "yes," or *False* for no.

[00358] ### <CONSTANT BOOLEAN>

Like other constant DyA's, the constant Boolean DyA can be used as an Identifier. Solitary constant Boolean values are always assumed to be compared to "TRUE." If the only used Identifier is TRUE then the system assumes the DyA to be TRUE = TRUE, which, of course returns TRUE. If the only used Identifier is FALSE then the system assumes the DyA to be TRUE = FALSE, which returns FALSE.

TRUE returns: TRUE

*Assumed to be the DyA: TRUE= TRUE*

FALSE returns: FALSE

*Assumed to be the DyA: TRUE= FALSE*

Constant Boolean Identifiers are usually used to query the return values of other, non-constant Boolean Identifiers.

SPECIALDAYS(12)=FALSE

SPECIALDAYS({number})

The SPECIALDAYS Identifier asks the question: "Is the target day a specified special day?" This Identifier accepts a numerical parameter specifying the special day. The Identifier returns TRUE if the target day *is* the special day and FALSE if it is not.

**\*(TARGET)SPECIALDAYS(1) or SPECIALDAYS(1) returns: FALSE.**

*Assuming that the target day is not a special day in assigned as 1.*

**\*(12/25/2002)SPECIALDAYS(1) returns: TRUE.**

*Assuming that Christmas day, 2002, is defined as special day 1.*

SHIFTWORKING({shift})

The SHIFTWORKING Identifier asks the question: "Is the identified shift a working shift?" This Identifier accepts a numerical parameter specifying the shift group. The Identifier returns TRUE if the identified shift *is* a working shift, of the specified group, and FALSE if it is not.

SHIFTWORKING(1) returns: FALSE.

*Assuming that the shift 1 is not a working shift.*

MINIMUM({minimum group number})

The MINIMUN Identifier asks the question: "Does the identified shift have at least the minimum number of staff required?" This Identifier accepts a numerical parameter specifying the minimum group number. The Identifier returns TRUE if the identified shift *is* at least minimally staffed and FALSE if it is not.

MINIMUM(1) returns: TRUE.

*Assuming that the shift 1 has met minimal staffing requirements.*

RDOACTION

The RDOACTION Identifier asks the question: "Is the identified action an RDO action?" The Identifier returns TRUE if the identified action *is* an RDO action and FALSE if it is not.

RDOACTION returns: TRUE.

*Assuming that the action is an RDO action.*

NONASSIGNED

The NONASSIGNED Identifier asks the question: "Is the target action permanently unassigned?" The Identifier returns TRUE if the identified action *is* permanently unassigned and FALSE if it is not.

NONASSIGNED returns: TRUE.

*Assuming that the action is permanently unassigned.*

[00359] Variable Identifiers ("?")

[00360] The ? Identifier is used to assign a new value to *the* assumed variable provided by the system. This Identifier is only used for special applications-specific uses, and will not be covered in detail here.

[00361] String Identifiers

String Identifiers include constant stings ( <CONSTANT STRING> ) and the PATTERN Identifier.

Constant Strings

The use of constant strings is basic: enclose a collection of characters within single quotes.

'AAA' returns: AAA

'1' returns: 1

The practical application of Constant Strings is generally confined to the comparison (condition) of the PATTERN Identifiers return value (see below).

[00362] PATTERN

[00363] The concept of pattern segmenting is similar to explicit segmenting; however, the pattern segments always segment by 1day intervals. Each of these one-day segments, from start date to infinity, is then assigned a specific symbol from a repeating pattern.

[00364] The pattern symbols are defined by you. You can use the symbols to indicate, and distinguish: working days from non-working days, the $n^{th}$ working day in a pattern cycle, or the $n^{th}$ non-working day in a pattern cycle.

[00365] Example 1

[00366] The following examples illustrate the use of the PATTERN Identifier:

Condition: Your scheduled work pattern is...

| Jan 1 2001 | Jan 2 2001 | Jan 3 2001 | Jan 4 2001 | Jan 5 2001 | Jan 6 2001 | Jan 7 2001 | Jan 8 2001 | Jan 9 2001 |
|---|---|---|---|---|---|---|---|---|
| ON | | ON | | ON | | | | |

*(then repeat)*

[00367] Task: Using the pattern Identifier, determine if the target day is a working day.

[00368] PATTEN Identifier: PATTERN(01/01/2001,'10101000')

*This Identifier essentially assigns a '1' to each working day in the pattern and assigns a '0' to each non working day in the pattern. The defined pattern is then started on the "start day" (01/01/2001) and repeats itself continuously thorough time, as shown below:*

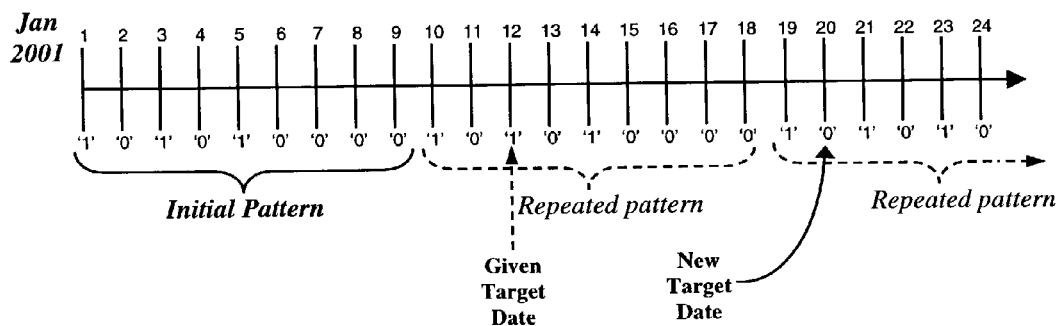

[00369] **DyC: *(01/20/2001)PATTERN(01/01/2001,'101010000')='1'**

*Based on the pattern, which starts on 01/01/2001, determine if the <u>redefined</u> target day of 01/20/2001 is a working day ('1'). This DyC's return value will equal "TRUE" if the $20^{th}$ is a working day or "FALSE" if the $20^{th}$ is a non-working day.*

[00370] Return Value: From the diagram above, you can see that the $20^{th}$ is "patterned" as a '0' (non-working day) and therefore the DyC's return value is "FALSE"

[00371] The "*(01/20/2001)" Identifier in the left DyA is, of course, a redefinition of the target day. This portion of the DyA is not necessary if your DyC is to return a value based on the given target day.

[00372] If, as in the above example, the given target day was 01/12/2001, the return value would have been "TRUE" since the $12^{th}$ is "patterned" as a '1' (working day).

Example 2

[00373] The above example of the PATTERN Identifier effectively discriminated working days from nonworking days, however, it only did so for one shift. The following example illustrates a more effective use of the PATTERN Identifier; a use that tracks the working and nonworking days for *three* shifts, instead of just one.

Condition: Your employer uses three shifts entitled A, B, and C, respectively. The table below reflects the working pattern for each shift. The bolded letters represent the first working day of each shift's "101010000" work pattern.

| Jan 1 2001 | Jan 2 2001 | Jan 3 2001 | Jan 4 2001 | Jan 5 2001 | Jan 6 2001 | Jan 7 2001 | Jan 8 2001 | Jan 9 2001 |
|---|---|---|---|---|---|---|---|---|
| A | C | A | B | A | B | C | B | C |

*(then repeat)*

[00374] Note that each shift still rotates on the '101010000' pattern, but each shifts starts this pattern on a different day. A's pattern begins on the 1st, B's pattern begins on the 4th, and C's pattern begins on the 7th – as indicated in bold.

[00375] Task: Using the pattern Identifier, determine if the target day is a working day for B-shift.

PATTEN Identifier: PATTERN(01/01/2001,'ACABABCBC')

*This Identifier essentially assigns a unique symbol to each shift's working day. The defined pattern is then started on the "start day" (01/01/2001) and repeats itself continuously thorough time. See below:*

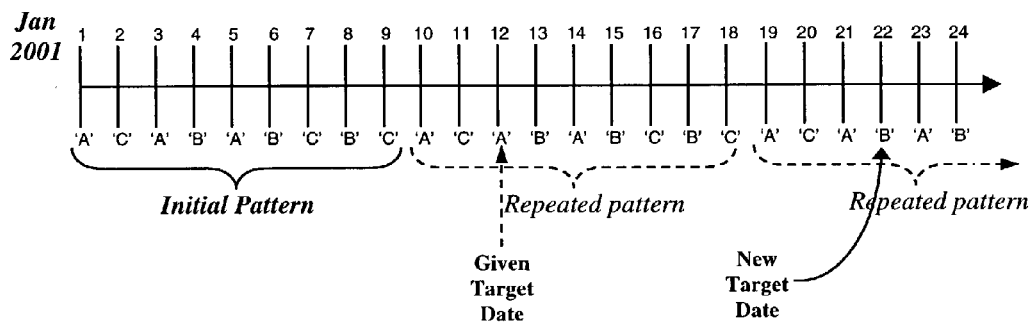

DyC: *(01/22/2001)PATTERN(01/01/2001,' ACABABCBC')='B'

*Based on the pattern, which starts on 01/01/2001, determine if the redefined target day of*

01/22/2001 is a working day ('B') for B-shift. This DyC will return "TRUE" if the $22^{nd}$ is patterned as a 'B' day or return "FALSE" if the $22^{nd}$ is patterned as an 'A' or 'C' day.

[00376] Using this same logic, you could also determine if the $22^{nd}$ is a <u>non</u>-working day for B-shift by using the DyC: *(01/22/2001)PATTERN(01/01/2001,'101010000')<>'B'

This DyC uses the "<>" symbols instead of the "=" symbol to state: "not equal to" (see "Operators" table).

[00377] Return Value: From the diagram above, you can see that the $22^{nd}$ is "patterned" as a 'B' (working day for B-shift) and therefore the DyC's return value is "TRUE"

Example 3

[00378] In some circumstances, it may become necessary to determine the $n^{th}$ working day or the $n^{th}$ non-working day of an individuals shift cycle (e.g., determine if a day is the $4^{th}$ day off in a shift's work cycle). The PATTERN Identifier can be used to uniquely label each day in a shifts cycle.

Condition: Your employer uses three shifts entitled A, B, and C, respectively. The table below reflects the beginning pattern for each work shift.

| Jan 1 2001 | Jan 2 2001 | Jan 3 2001 | Jan 4 2001 | Jan 5 2001 | Jan 6 2001 | Jan 7 2001 | Jan 8 2001 | Jan 9 2001 |
|---|---|---|---|---|---|---|---|---|
| A | C | A | B | A | B | C | B | C |

*(then repeat)*

[00379] Note that each shift still rotates on the '101010000' pattern, but each shits starts this pattern on a different day. A's pattern begins on the $1^{st}$, B's pattern begins on the $4^{th}$, and C's pattern begins on the 7th – as indicated in bold.

[00380] Task: Using the pattern Identifier, determine if the target day is the $1^{st}$ working day for C-shift.

[00381] PATTEN Identifier: PATTERN(01/01/2001,'ABCDEFGHI')

*There are two important aspects of the above pattern:*

[00382] *Each day in the shift pattern is assigned a unique character.*

[00383] *Each character represents a different meaning for each shift.*

*The table below shows how each character can be interpreted for each shift:*

| PATTERN Character | A Shift | B Shift | C Shift |
| --- | --- | --- | --- |
| 'A' | 1st Working Day | 4th Day Off | 2nd Day Off |
| 'B' | 1st Day Off | 5th Day Off | 3rd Working Day |
| 'C' | 2nd Working Day | 6th Day Off | 3rd Day Off |
| 'D' | 2nd Day Off | 1st Working Day | 4th Day Off |
| 'E' | 3rd Working Day | 1st Day Off | 5th Day Off |
| 'F' | 3rd Day Off | 2nd Working Day | 6th Day Off |
| 'G' | 4th Day Off | 2nd Day Off | 1st Working Day |
| 'H' | 5th Day Off | 3rd Working Day | 1st Day Off |
| 'I' | 6th Day Off | 3rd Day Off | 2nd Working Day |

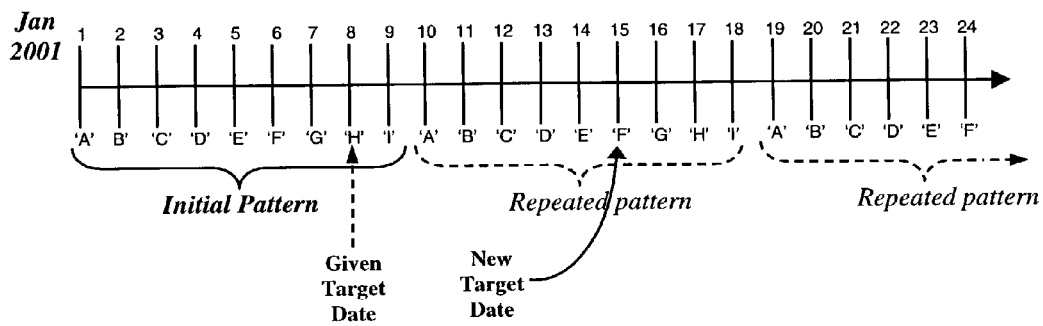

DyC: *(01/15/2001)PATTERN(01/01/2001,'ABCDEFGHI')='G'

*Based on the pattern table above, 'G' represents the $1^{st}$ working day for C shift. Therefore, this DyC will return "TRUE" only if the $15^{th}$ is C shifts $1^{st}$ working day of this shift pattern.*

[00384] Return Value: From the diagram above, you can see that the $15^{th}$ is "patterned" as an 'F': C-shifts $6^{th}$ day off on C-shifts current shift cycle. The DyC would have been "TRUE" if the redefined Target Date had been the $7^{th}$, the $16^{th}$, the $25^{th}$ (not shown), or even 03/31/2004 (not shown).

[00385] Also, as shown by the pattern table (above), the given DyC also returns TRUE if the target day is A shift's $4^{th}$ day off or B shift's $2^{nd}$ day off.

compounding DyC's

[00386] Compounded DyC's are DyC's that are comprised of two or more expressions that, of themselves, can be considered DyC's. To compound two or more DyC's you must use one of the two logical operators: the "&" symbol ("and") or the "|" symbol ("or").

[00387] Using one of these two logical operators will allow you to create one expression that evaluates multiple conditions. Plainly stated: *compounded DyC's allow you to build sets of very complex conditions that are able to meet the unique and changing needs of your business.*

[00388] And (& symbol)

[00389] The "&" symbol (Shift+7), when used, indicates that the *two* DyC linked by it must *both* return "TRUE" for the compound DyC to return "TRUE."

[00390] For example:

| February, 2001 | | | | | | |
|---|---|---|---|---|---|---|
| S | M | T | W | T | F | S |
|   |   |   |   | 1 | 2 | 3 |
| 4 | 5 | 6 | 7 | 8 | 9 | 10 |
| 11 | 12 | 13 | 14 | 15 | 16 | 17 |
| 18 | 19 | 20 | 21 | 22 | 23 | 24 |
| 25 | 26 | 27 | 28 |   |   |   |

*For the given target day...*

[00391] DAY=14 & MONTH=2 returns: TRUE

*The Target Dates DAY is the $14^{th}$ and the MONTH is the $2^{nd}$ month.*

[00392] For clarity, the following steps illustrate how the system uses the above DyC to find the final return value.

[00393] DAY=14 & MONTH=2

[00394] TRUE & TRUE

*The DyC's DAY=14, and MONTH=2 are first evaluated for their own return values. The resulting values are then substituted back into the compounded DyC.*

[00395] TRUE

As stated in the description, the return value is TRUE only if the two DyC's linked by the & symbol are individually evaluated as TRUE.

[00396] The DyC DAY=14 & MONTH=3 would return FALSE since it would be first evaluated to TRUE & FALSE and then, finally, FALSE.

[00397] Or (| symbol)

[00398] In contrast to the "and" symbol (&), the "or" symbol (|) will return TRUE if *either* one (or both) of the two DyC's linked by the | symbol are individually evaluated as TRUE.

For example:

| February, 2001 | | | | | | |
|---|---|---|---|---|---|---|
| S | M | T | W | T | F | S |
|  |  |  |  | 1 | 2 | 3 |
| 4 | 5 | 6 | 7 | 8 | 9 | 10 |
| 11 | 12 | 13 | 14 | 15 | 16 | 17 |
| 18 | 19 | 20 | 21 | 22 | 23 | 24 |
| 25 | 26 | 27 | 28 |  |  |  |

*For the given target day...*

[00399] DAY=14 | MONTH=3 returns: TRUE

*The Target Dates DAY is the $14^{th}$, but the MONTH is not the $3^{rd}$ month.*

[00400] For clarity, the following steps illustrate how the system uses the above DyC to find the final return value.

[00401] DAY=14 | MONTH=3

[00402] TRUE | FALSE

*The DyC's DAY=14, and MONTH=3 are first evaluated for their own values. The resulting values are then substituted back into the compounded DyC.*

[00403] TRUE

As stated in the description, the return value is TRUE if either one of the two DyC's linked by the | symbol are individually evaluated as TRUE.

[00404] The DyC DAY=20 | MONTH=2 would also return TRUE since it would be first evaluated to FALSE | TRUE and then, finally, TRUE.

[00405] The DyC DAY=14 | MONTH=2 would return TRUE since it would be first evaluated to TRUE | TRUE and then, finally, TRUE.

[00406] ...while the DyC DAY=20 | MONTH=7 would return FALSE since it would be first evaluated to FALSE | FALSE and then, finally, FALSE.

[00407] Brackets

[00408] Brackets define the order of evaluation: compound DyC's using brackets will be evaluated inside out.

[00409] Bracket use becomes important in compound DyC's, especially when using DyC's that contain the | symbol.

[00410] As shown above, you understand that a DyC that first evaluates to TRUE & FALSE will return FALSE, while one that initially evaluates to TRUE | FALSE returns TRUE. However, the DyC of FALSE & TRUE | TRUE might be interpreted to either True or False depending on if, and where, brackets are used.

Since bracketed DyC are evaluated from inside out, the placement of the brackets is crucial for correct evaluation *when using the | symbol*. The following examples show how brackets affect return values, even with the use of the same constants:

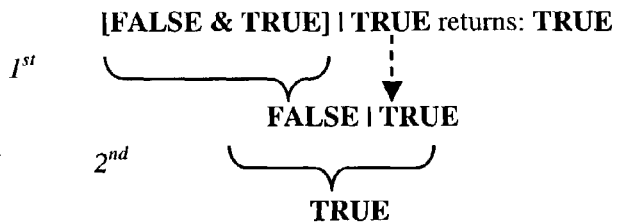

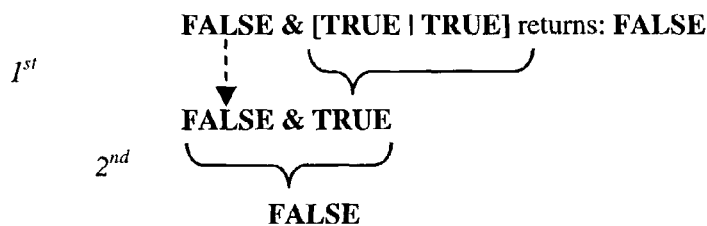

*The same logically ordered steps are taken for the following:*

[TRUE | FALSE] | [FALSE | FALSE] returns: TRUE

*This DyC returns TRUE if any one of its constants are TRUE.*

TRUE | [FALSE | FALSE] & FALSE returns: FALSE

This DyC must contain at least three TRUE constants to return TRUE.

[00411] Examples

[00412] The following examples are given to illustrate the compound DyC building techniques discussed above, as well as to illustrate some practical examples of their use.

*Determine if target day is a weekend or holiday.*

DAYOFWEEK=1 | DAYOFWEEK=7 | SPECIALDAY(1)

*Determine if target day is a working day on weekend.*

PATTERN(01/01/1990,'10101000')='1' & [DAYOFWEEK=1 | DAYOFWEEK=7]

*or...*

PATTERN(01/01/2000,'S0S0S000')=PATTERN(01/01/2000,'SSMTWTF')

*or...*

PATTERN(01/01/2000,'10101000')=PATTERN(01/01/2000,'11ddddd')

*Determine the date of the second Friday of next month*

\*(##/../####+1day)FRIDAY(2)

*or...*

\*(##/01/####+1month)FRIDAY(2)

*Determine if target is a Weekend in Summer (June, July, or August).*

PATTERN(01/01/1990,'SMTWtFS')='S' & [MONTH=6 | MONTH=7 | MONTH=8]

*or...*

PATTERN(01/01/1995,'SMTWtFS')='S' & [TRUNCATE(DIVIDE(MONTH,3),0)=2]

Building For Speed

[00413] There are and indefinite number of Identifier and Component combinations that can be used to build DyD and DyC that will return valid and functional values. However, consider this: these, sometimes lengthy, expressions may have to be used to evaluate conditions for large lists of potential employees over great spans of time. The need for effect and faster processing expressions becomes apparent.

[00414] Shorthand

[00415] The use of shorthand notation signals the system that the DyC's used are alike. The system is then able to skip over processing steps usually used to determine the type of DyA. This ability results in a much shorter processing time.

[00416] Shorthand notation is expressing compound DyC's without the unneeded (redundant) portions of the normal syntax.

[00417] Besides building for speed, there is an additional incentive for the use of shorthand notation: each final DyC is limited to 255 characters (including spaces). The ability to use shorthand notation conserves the number of available characters to increase the final DyC's complexity potential (number of DyC's contained in the final DyC).

[00418] You have already been exposed to the use of some shorthand notation syntax: using SUNDAY instead of *(TARGET)SUNDAY(-1). The omission of "*(TARGET)" when using any Identifier that will use the *given* target as *the* target is short-hand, as is the omission of the "(-1)" when the desired return value is the "first, on or before."

[00419] The remaining shorthand notation is used exclusively with operators and the & symbol (e.g., &...=, &...<, &...>). For example: the DyC DAY>5 & DAY<15 can be re-written using short hand notation. The general rule for using shorthand is, if the first Identifier remains the same in following comparisons (e.g., DAY), only include that Identifier in the *first* comparison and omit all & symbols.

[00420] Using this rule, DAY>5 & DAY<15 can be re-written as DAY>5<15. The " & DAY" Identifier, with respect to the "<15" comparison, is omitted. The following are more examples of the use of shorthand notation:

[00421] Before: DAY>5 & DAY<15 & DAY<>10 # Characters: 24
After: DAY>5<15<>10 # Characters: 12

[00422] Before: TODAY>10/27/1970 & TODAY<10/31/1999  # Characters: 35
After: TODAY>10/27/1970<10/31/1999  # Characters: 27

[00423] Before:
[00424] DAYOFWEEK<>2 & DAYOFWEEK<>4 & DAYOFWEEK<>6  # Char's: 42
After: DAYOFWEEK<>2<>4<>6  # Characters: 18

[00425] <u>Remember</u>: the use of the above short hand methods assume that all logical operators are "&" operators. This type of short hand notation will not work with statement designed to implement any I symbols.

[00426] Use The Assumed Comparisons

[00427] DyA's and DyC's, unless specified otherwise, are always compared to built-in assumed values of similar types. DyD's used in DyC's are always assumed to be compared to the Target Date. Therefore the DyC "TARGET = TODAY" can be simply written "TODAY."

[00428] Similarly, all Boolean DyA's are assumed to be compared to TRUE:

[00429] SPECIALDAYS(12) is faster than SPECIALDAYS(12)=TRUE

[00430] For numerical returning DyA's the system assumes the comparison to be <u>not equal to zero</u>, or "<>0." Although this may seem odd at first, this assumption makes sense. The system assumes the given DyC should return TRUE as long as its DyA has *some* value (other than 0). Therefore...

[00431] MODULO(DAYOF WEEK,2) is faster than the assumed MODULO(DAYOFWEEK,2)<>0

[00432] For the same reason, string DyA's are also assumed to be compared to "not zero." Although, in their case, the zero is the string representation for zero: <>'0' Therefore...

[00433] Pattern(##/01/####,'101010000') is faster than the assumed DyC Pattern(##/01/####,'101010000')<>'0'

[00434] Remember, these shorthand methods are only applicable if the system is expecting a DyC.

[00435] Keep It Simple

[00436] Using the full expression when assumed values could be used slows the system down. For example, if you're basing your DyD on the target day, don't used the *(TARGET) component.

[00437] Also, longer expressions take longer to process. Unnecessary components, or unnecessary parameters will only slow the systems ability to process DyA's and DyC's. Therefore, you should try to use single Component DyA's that perform the same task as multi-component DyA's. For example:

[00438] Instead of: PATTERN(01/01/1995, '1234567')

[00439] Use: DAYOFWEEK

[00440] Instead of: *(*(SUNDAY)SUNDAY)SUNDAY

[00441] Use: SUNDAY

[00442] The Speed Hierarchy of Identifiers

[00443] Each Identifier has its own inherent functions it must perform in order to return a value. It turn, there are groups of Identifiers that process is similar fashion. For instance: SUNDAY and MONDAY, although different Identifiers, can be expected to process in about the same way – and therefore, take the same time. However, the variable Identifier SUNDAY and the constant Identifier 12/29/2001 do not take the same amount of time to process – even if the variable SUNDAY evaluates to the return value of 12/29/2001. With this fact in mind, it can be correctly stated that different type Identifiers process at different speeds. Below are the Identifier Types, listed in order of Fastest to slowest:

| Identifier | Example: |
|---|---|
| Constant Identifiers | 01/01/1995 |
| Constant Strings | 'A' |
| Wildcard Identifiers | ##/../1995    *(the less wildcards, the faster)* |
| Numerical Identifiers | DAY |
| Variable Identifiers | SUNDAY |
| Symbol Identifiers | *(SUNDAY)... ^(NOW,1day)... +1week... −1year... |
| Math Identifiers | DIVIDE(4,2) |
| PATTERN Identifier | PATTERN(01/01/1995, '1234567') |

[00444] This hierarchy is not designed to dissuade you from the use of some identifiers. It is, instead, provided for your knowledge. It may enable you to build faster expression, substituting a faster Identifiers for slower Identifiers where able.

Tables

Identifiers List

The following is an exemplary list of available Identifiers for use in DyA's.

| Name | Description | Type | Parameter Type (if avail) | Example |
|---|---|---|---|---|
| ? | Variable value allowed in special conditions usually associated with rules | Variable | | ? |
| <CONSTANT BOOLEAN> | A constant Boolean value of TRUE or FALSE | Boolean | | TRUE |
| <CONSTANT DATE & TIME> | A date & a time together (MM/DD/YYYY hh:mm:ss) | Date and time | | 1/3/64 23:59:00 |
| <CONSTANT DATE> | A constant date (MM/DD/YYYY) | Date | | 1/3/64 |
| <CONSTANT NUMBER> | A constant number | Number | | 24 |
| <CONSTANT STRING> | A string (surrounded by single quotes) | String | | 'A' |
| <CONSTANT TIME> | A constant military time (hh:mm:ss) | Time | | 23:59:59 |
| <WILDCARD DATE> | Use '#' or '.' in place of numbers (ex. '02/../####' = last day of Feb in current year) | Date | Time | 02/../#### |
| <WILDCARD TIME> | Use '#' or '.' in place of numbers (ex. '##:30:00' = have way through current hour) | Time | Time | ##:30:00 |
| AGENCY | Returns the gray number of the target Agency | Number | | AGENCY |
| DAY | The day of the target month | Number | | DAY |
| DAYOFWEEK | The weekday of the Target Date (Sunday=1, ..., Saturday=7) | Number | | DAYOFWEEK |
| DURATION | The duration in hours of the action | Number | | DURATION |
| END | End date & time of the action being filled | Date and time | | END |
| FLSAEND | The end date of each candidates FLSA period on or before/on or after the Target Date | Date | Time | FLSAEND |
| FLSASTART | The start date of each candidates FLSA period on or before/on or after the Target Date | Date | Time | FLSASTART |
| FRIDAY | The most recent Friday on or before/on or after the Target Date and offset by the parameter | Date | Time | FRIDAY |
| JOBTITLE | Returns the gray number of the target Job Title | Number | | JOBTITLE |
| LEAPDAY | The most recent leap year day on or before/on or after the Target Date and offset by the parameter | Date | Time | LEAPDAY |
| MINIMUM | Returns TRUE if the conditions specified in the minimum staffing group with a gray number that matches the given parameter are met | Boolean | Number | MINUMUM(3) |
| MONDAY | The most recent Monday on or before/on or after the Target Date and offset by the parameter | Date | Time | MONDAY |
| MONTH | The month of the target month | Number | | MONTH |
| NONASSIGNED | Returns TRUE if the target action is permanently unassigned | Boolean | | NONASSIGNED |
| NOW | The date & time at the moment of use | Date and time | | NOW |
| PATTERN | Returns the appropriate character in the pattern using the give start date, pattern and the Target Date as a reference | String | Date | PATTERN(01/01/1990,'101010000')='1' |
| PAYROLLEND | The end date of each candidates payroll period on or before/on or after the Target Date | Date | Time | PAYROLLEND |

| Name | Description | Type | Parameter Type (if avail) | Example |
|---|---|---|---|---|
| PAYROLLSTART | The start date of each candidates payroll period on or before/on or after the Target Date | Date | Time | PAYROLLSTART |
| POSITION | Returns the gray number of the target Position | Number | | POSITION |
| RDOACTION | Returns TRUE if the target action is an RDO action | Boolean | | RDOACTION |
| REGION | Returns the gray number of the target Region | Number | | REGION |
| SATURDAY | The most recent Saturday on or before/on or after the Target Date and offset by the parameter | Date | Time | SATURDAY |
| SHIFT | Returns the gray number of the target Shift | Number | | SHIFT |
| SHIFTDAY | The most recent working shift day for the target shift on or before the Target Date identified by the parameter | Date | Time | SHIFTDAY |
| SHIFTDURATION | The duration in hours of the target shift | Number | Condition | SHIFTDURATION |
| SHIFTEND | The end date & time of the target shift | Date and time | Condition | SHIFTEND |
| SHIFTPATTERNDAY | The most recent shift day for the target shift on or before/on or after the Target Date identified by the parameter | Date | Condition | SHIFTPATTERNDAY |
| SHIFTSTART | The start date & time of the target shift | Date and time | Condition | SHIFTSTART |
| SHIFTWORKING | Indicates TRUE if the shift identified in the parameter is working on the Target Date | Boolean | Number | SHIFTWORKING(1) |
| SPECIALDAY | The most recent special day on or before/on or after the Target Date and offset by the parameter | Date | Number | SPECIALDAY(12) |
| SPECIALDAYS | Returns true if there are any special days on the Target Date in the target special day group if supplied | Boolean | Number | SPECIALDAYS(1) |
| START | Start date & time of the action being filled | Date and time | | START |
| STATION | Returns the gray number of the target Station | Number | | STATION |
| SUNDAY | The most recent Sunday on or before/on or after the Target Date and offset by the parameter | Date | Time | SUNDAY |
| TARGET | The date being targeted | Date | | TARGET |
| THURSDAY | The most recent Thursday on or before/on or after the Target Date and offset by the parameter | Date | Time | THURSDAY |
| TODAY | Today's date | Date | | TODAY |
| TUESDAY | The most recent Tuesday on or before/on or after the Target Date and offset by the parameter | Date | Time | TUESDAY |
| UNIT | Returns the gray number of the target Unit | Number | | UNIT |
| WEDNESDAY | The most recent Wednesday on or before/on or after the Target Date and offset by the parameter | Date | Time | WEDNESDAY |
| YEAR | The year of the target month | Number | | YEAR |

Note: Identifiers listed within the <> symbols represent constant entries. As shown in the example for each, you would enter actual values (e.g., 01/01/1999) and not the Identifier name "<CONSTANT DATE>".

Relational Operators

The following is the list of allowable relational operators. Each operator is given a description and two examples.

| Relational Operators | Description | Example | Example's Return Value |
|---|---|---|---|
| < | Used to compare one Identifier to another. Returns TRUE if the Identifier on the left is LESS THAN the Identifier on the right. | 01/01/2001<01/31/2001<br>SUNDAY<SUNDAY | TRUE<br>FALSE |

| Relational Operators | Description | Example | Example's Return Value |
|---|---|---|---|
| > | Used to compare one Identifier to another. Returns TRUE if the Identifier on the left is <u>GREATER THAN</u> the Identifier on the right. | 01/01/2001>01/31/2001<br>SUNDAY>SUNDAY | FALSE<br>FALSE |
| <= | Used to compare one Identifier to another. Returns TRUE if the Identifier on the left is <u>LESS THAN OR EQUAL TO</u> the Identifier on the right. | 01/01/2001<=06/15/1999<br>SUNDAY<=SUNDAY | FALSE<br>TRUE |
| >= | Used to compare one Identifier to another. Returns TRUE if the Identifier on the left is <u>GREATER THAN OR EQUAL TO</u> the Identifier on the right. | 01/01/2001>=06/15/1999<br>SUNDAY>=SUNDAY | TRUE<br>TRUE |
| = | Used to compare one Identifier to another. Returns TRUE if the two Identifiers are <u>EQUAL</u>. | 01/01/2001=021/02/2001<br>TRUE = FALSE | TRUE<br>FALSE |
| <> | Used to compare one Identifier to another. Returns TRUE if the two Identifiers are <u>NOT EQUAL</u>. | SUNDAY <> FRIDAY<br>FALSE <> FALSE | TRUE<br>FALSE |

Logical Operators

| Logical Operators | Description | Example | Example's Return Value |
|---|---|---|---|
| I | (Shift + Backslash key) Used to create a compound DyA where only one DyA must equal TRUE. | TRUE I FALSE<br>FALSE I FALSE | TRUE<br>FALSE |
| & | Used to create a compound DyA where all DyA's must equal TRUE. | TRUE & FALSE<br>[00445] TRUE & TRUE | FALSE<br>[00446] TRUE |

I claim:

1. A method performed on a computing device, comprising:
receiving a date input as an expression having one or more components and one or more parameters that modify the value of a particular component of the expression, the expression to establish and manipulate a target date in order to determine a resultant date, wherein the one or more components include a target date component, a primary component, a segmenting component, and an offset component, and wherein each component is defined by an identifier associated with one or more parameters qualifying the respective component;
determining if a date-effecting condition is associated with the expression by examining each of the primary component, segmenting component, and the offset component in order to determine the date-effecting condition, wherein the target date component is used to specify an initial target date as a starting point of the resultant date, wherein the primary component is used to specify a secondary input date to reference the target date against, wherein the segmenting component is used to explicitly segment time based on one or more parameters and a date returned the target date component and the primary component, and wherein the offset component is used to set off by a fixed amount a date value of at least one of the target date component, primary component, and the segmenting component; and
modifying the target date based upon the date-effecting condition in order to generate the resultant date, wherein an identifier of each component defines a constant value, variable value, and/or symbol to indicate a type of the associated parameters, and wherein one or more parameters associated with the identifier of each component are used to specify how the respective component can be used.

2. The method of claim 1, wherein an identifier of the primary component specifies a particular day and an associated parameter is an occurrence parameter that determines which occurrence of the identified day is to be returned with respect to the target date.

3. The method of claim 2, wherein the occurrence parameter is defined via either a positive number or a negative number, wherein when the occurrence parameter includes a positive number, the target dated is modified to a day on or after the particular day specified by the identifier of the primary component since the target date specified by the target date component, and wherein the number itself specifies a number of occurrences of the particular day in between the target date and the modified target date.

4. The method of claim 3, wherein when the occurrence parameter includes a negative number, the target dated is modified to a day the first on or before the particular day specified by the identifier of the primary component since the target date specified by the target date component, and wherein the number itself specifies a number of occurrences of the particular day in between the target date and the modified target date.

5. The method of claim 4, wherein the particular day specified by the identifier of the primary component is a particular day of a week as one of "Monday", "Tuesday", "Wednesday", "Thursday", "Friday", "Saturday", and "Sunday".

6. The method of claim 5, wherein the modified target date becomes a number of occurrences of a particular day of the week specified by the primary component either on/after or on/before the original target date, and wherein the modified target date is used to construct the resultant date.

7. The method of claim 6, wherein the offset component includes an identifier and a constant value followed by a measurement of time, wherein the modified target date is further modified by a fixed amount represented by a number of measured time units specified by the constant value and the measurement of time as a measured time unit.

8. The method of claim 7, wherein the identifier of the offset component is either a plus sign (+) or a minus sign (−), wherein when the identifier of the offset component is a plus sign (+), the target date is further modified by offsetting from the prior target date by the fixed amount specified by the offset component, on or after the prior target date.

9. The method of claim 8, wherein when the identifier of the offset component is a minus sign (−), the target date is further modified by offsetting from the prior target date by the fixed amount specified by the offset component, on or before the prior target date.

10. The method of claim 9, wherein the measurement of time is one of year, month, week, day, hour, minute, and second.

11. The method of claim 7, wherein the segmenting component includes a first parameter specifying a date from which segmenting is to be based on, a second parameter specifying an interval, and a third parameter specifying an occurrence, wherein starting from a date specified by the first parameter, time is segmented for every interval specified by the second parameter, the resultant date is determined based on a particular occurrence specified by the third parameter of the time segments after a reference date returned based on a previous component of the expression.

12. The method of claim 11, wherein the segmenting component is identified by a symbol identifier of "^" and the target date component is identified by a symbol identifier of "*".

13. A machine-readable storage medium that provides instructions tangibly stored therein, which when executed by a machine, cause the machine to perform operations comprising:
receive a date input as an expression having one or more components and one or more parameters that modify the value of a particular component of the expression, the expression to establish and manipulate a target date in order to determine a resultant date, wherein the one or more components include a target date component, a primary component, a segmenting component, and an offset component, and wherein each component is defined by an identifier associated with one or more parameters qualifying the respective component;
determine if a date-effecting condition is associated with the expression by examining each of the primary component, segmenting component, and the offset component in order to determine the date-effecting condition, wherein the target date component is used to specify an initial target date as a starting point of the resultant date, wherein the primary component is used to specify a secondary input date to reference the target date against, wherein the segmenting component is used to explicitly segment time based on one or more parameters and a date returned the target date component and the primary component, and wherein the offset component is used to set off by a fixed amount a date value of at least one of the target date component, primary component, and the segmenting component; and
modify the target date based upon the date-effecting condition in order to generate the resultant date, wherein an identifier of each component defines a constant value, variable value, and/or symbol to indicate a type of the associated parameters, and wherein one or more parameters associated with the identifier of each component are used to specify how the respective component can be used.

14. The machine-readable storage medium of claim 13, wherein an identifier of the primary component specifies a particular day and an associated parameter is an occurrence parameter that determines which occurrence of the identified day is to be returned with respect to the target date.

15. The machine-readable storage medium of claim 14, wherein the occurrence parameter is defined via either a positive number or a negative number, wherein when the occurrence parameter includes a positive number, the target dated is modified to a day on or after the particular day specified by the identifier of the primary component since the target date specified by the target date component, and wherein the number itself specifies a number of occurrences of the particular day in between the target date and the modified target date.

16. The machine-readable storage medium of claim 15, wherein when the occurrence parameter includes a negative number, the target dated is modified to a day the first on or before the particular day specified by the identifier of the primary component since the target date specified by the target date component, and wherein the number itself specifies a number of occurrences of the particular day in between the target date and the modified target date.

17. The machine-readable storage medium of claim 16, wherein the particular day specified by the identifier of the primary component is a particular day of a week as one of "Monday", "Tuesday", "Wednesday", "Thursday", "Friday", "Saturday", and "Sunday".

18. The machine-readable storage medium of claim 17, wherein the modified target date becomes a number of occurrences of a particular day of the week specified by the primary component either on/after or on/before the original target date, and wherein the modified target date is used to construct the resultant date.

19. The machine-readable storage medium of claim 18, wherein the offset component includes an identifier and a constant value followed by a measurement of time, wherein the modified target date is further modified by a fixed amount represented by a number of measured time units specified by the constant value and the measurement of time as a measured time unit.

20. The machine-readable storage medium of claim 19, wherein the identifier of the offset component is either a plus sign (+) or a minus sign (−), wherein when the identifier of the offset component is a plus sign (+), the target date is further modified by offsetting from the prior target date by the fixed amount specified by the offset component, on or after the prior target date.

21. The machine-readable storage medium of claim 20, wherein when the identifier of the offset component is a minus sign (−), the target date is further modified by offsetting from the prior target date by the fixed amount specified by the offset component, on or before the prior target date.

22. The machine-readable storage medium of claim 21, wherein the measurement of time is one of year, month, week, day, hour, minute, and second.

23. The machine-readable storage medium of claim 19, wherein the segmenting component includes a first parameter specifying a date from which segmenting is to be based on, a second parameter specifying an interval, and a third parameter specifying an occurrence, wherein starting from a date specified by the first parameter, time is segmented for every interval specified by the second parameter, the resultant date is determined based on a particular occurrence specified by the third parameter of the time segments after a reference date returned based on a previous component of the expression.

24. The machine-readable storage medium of claim 23, wherein the segmenting component is identified by a symbol identifier of "^" and the target date component is identified by a symbol identifier of "*".

25. A data processing system, comprising:

a processor; and a memory coupled to the processor for storing instructions, which when executed from the memory, cause the processor to perform a method, the method including receiving a date input as an expression having one or more components and one or more parameters that modify the value of a particular component of the expression, the expression to establish and manipulate a target date in order to determine a resultant date, wherein the one or more components include a target date component, a primary component, a segmenting component, and an offset component, and wherein each component is defined by an identifier associated with one or more parameters qualifying the respective component, determining if a date-effecting condition is associated with the expression by examining each of the primary component, segmenting component, and the offset component in order to determine the date-effecting condition, wherein the target date component is used to specify an initial target date as a starting point of the resultant date, wherein the primary component is used to specify a secondary input date to reference the target date against, wherein the segmenting component is used to explicitly segment time based on one or more parameters and a date returned the target date component and the primary component, and wherein the offset component is used to set off by a fixed amount a date value of at least one of the target date component, primary component, and the segmenting component, and modifying the target date based upon the date-effecting condition in order to generate the resultant date, wherein an identifier of each component defines a constant value, variable value, and/or symbol to indicate a type of the associated parameters, and wherein one or more parameters associated with the identifier of each component are used to specify how the respective component can be used.

26. The system of claim 25, wherein an identifier of the primary component specifies a particular day and an associated parameter is an occurrence parameter that determines which occurrence of the identified day is to be returned with respect to the target date.

27. The system of claim 26, wherein the occurrence parameter is defined via either a positive number or a negative number, wherein when the occurrence parameter includes a positive number, the target dated is modified to a day on or after the particular day specified by the identifier of the primary component since the target date specified by the target date component, and wherein the number itself specifies a number of occurrences of the particular day in between the target date and the modified target date.

28. The system of claim 27, wherein when the occurrence parameter includes a negative number, the target dated is modified to a day the first on or before the particular day specified by the identifier of the primary component since the target date specified by the target date component, and wherein the number itself specifies a number of occurrences of the particular day in between the target date and the modified target date.

29. The system of claim 28, wherein the particular day specified by the identifier of the primary component is a particular day of a week as one of "Monday", "Tuesday", "Wednesday", "Thursday", "Friday", "Saturday", and "Sunday".

30. The system of claim 29, wherein the modified target date becomes a number of occurrences of a particular day of the week specified by the primary component either on/after or on/before the original target date, and wherein the modified target date is used to construct the resultant date.

31. The system of claim 30, wherein the offset component includes an identifier and a constant value followed by a measurement of time, wherein the modified target date is further modified by a fixed amount represented by a number of measured time units specified by the constant value and the measurement of time as a measured time unit.

32. The system of claim 31, wherein the identifier of the offset component is either a plus sign (+) or a minus sign (−), wherein when the identifier of the offset component is a plus sign (+), the target date is further modified by offsetting from the prior target date by the fixed amount specified by the offset component, on or after the prior target date.

33. The system of claim 32, wherein when the identifier of the offset component is a minus sign (−), the target date is further modified by offsetting from the prior target date by the fixed amount specified by the offset component, on or before the prior target date.

34. The system of claim 33, wherein the measurement of time is one of year, month, week, day, hour, minute, and second.

35. The system of claim 31, wherein the segmenting component includes a first parameter specifying a date from which segmenting is to be based on, a second parameter specifying an interval, and a third parameter specifying an occurrence, wherein starting from a date specified by the first parameter, time is segmented for every interval specified by the second parameter, the resultant date is determined based on a particular occurrence specified by the third parameter of the time segments after a reference date returned based on a previous component of the expression.

36. The system of claim 35, wherein the segmenting component is identified by a symbol identifier of "^" and the target date component is identified by a symbol identifier of "*".

* * * * *